United States Patent
Abato et al.

(10) Patent No.: US 6,513,069 B1
(45) Date of Patent: Jan. 28, 2003

(54) ENHANCED VIDEO PROGRAMMING SYSTEM AND METHOD FOR PROVIDING A DISTRIBUTED COMMUNITY NETWORK

(75) Inventors: Michael R. Abato, White Plains, NY (US); Craig D. Ullman, Brooklyn, NY (US); Jeffrey M. Harrington, Brooklyn, NY (US); Carl R. Duda, Santa Barbara, CA (US)

(73) Assignee: ACTV, Inc., New York, NY (US)

( * ) Notice: Subject to any disclaimer, the term of this patent is extended or adjusted under 35 U.S.C. 154(b) by 0 days.

(21) Appl. No.: 09/396,693

(22) Filed: Sep. 15, 1999

Related U.S. Application Data

(63) Continuation-in-part of application No. 09/109,945, filed on Jul. 6, 1998, now Pat. No. 6,018,768, which is a continuation-in-part of application No. 08/615,143, filed on Mar. 14, 1996, now Pat. No. 5,778,181, which is a continuation-in-part of application No. 08/613,144, filed on Mar. 8, 1996, now abandoned.

(51) Int. Cl.[7] .............................................. G06F 13/00
(52) U.S. Cl. ........................ 709/238; 709/218; 709/231
(58) Field of Search ................................ 709/202, 203, 709/205, 206, 217, 218, 219, 223, 224, 226, 230, 231, 238, 250, 329

(56) References Cited

U.S. PATENT DOCUMENTS

| 4,734,764 A | 3/1988 | Pocock et al. |
| 4,894,789 A | 1/1990 | Yee |
| 4,905,094 A | 2/1990 | Pocock et al. |

(List continued on next page.)

FOREIGN PATENT DOCUMENTS

| DE | 19545882 | 6/1997 |
| EP | 0 163 577 | 12/1985 |
| EP | 757485 A2 | 2/1997 |
| GB | 2 359 708 A | 8/2001 |
| GB | 2 359 958 A | 9/2001 |
| WO | 93/06675 A1 | 4/1993 |
| WO | 9413107 | 6/1994 |
| WO | WO 96/07270 | 3/1996 |
| WO | WO 96/13124 | 5/1996 |
| WO | 97/02689 A1 | 1/1997 |
| WO | WO 97/02689 | 1/1997 |
| WO | 9702699 | 1/1997 |
| WO | WO 97/27546 | 7/1997 |
| WO | 99/45726 | 9/1999 |
| WO | 00/14987 | 3/2000 |

OTHER PUBLICATIONS

Press Release, Intercast Industry Group, *Leaders in PC, Broadcast and Cable Industries Announce Formation of Industry Group to Promote New Digital Medium for the Home PC*, Business Wire, Oct. 23, 1995.

Vinay Kumar, Jay Glicksman and Glenn A. Dramer, *A SHAREd Web to Support Design Teams*, Third Workshop on Enabling Technologies: Infrastructure for Collaborative Enterprises, Morgantown, West Virginia, Apr. 17–19, 1994 at 178.

(List continued on next page.)

*Primary Examiner*—Viet D. Vu
(74) *Attorney, Agent, or Firm*—Dorsey & Whitney LLP

(57) ABSTRACT

A distributed community network for providing services to an arbitrarily large community of end users by distributing the load among many machines. The network uses hubs on the machines for routing packets. The hubs obtain routing instructions from a router and use those instructions for routing the packets. The packets include content for the machines based upon a particular network service, such as a chat service for permitting users to interact in chat rooms or a push/pull service for pushing content to the user machines either directly or based upon information received from the users.

43 Claims, 16 Drawing Sheets

U.S. PATENT DOCUMENTS

| | | |
|---|---|---|
| 4,941,040 A | 7/1990 | Pocock et al. |
| 5,014,125 A | 5/1991 | Pocock et al. ................. 348/7 |
| 5,128,752 A | 7/1992 | Von Kohorn |
| 5,140,419 A | 8/1992 | Galumbeck et al. ........ 348/465 |
| 5,191,410 A | 3/1993 | McCalley et al. |
| 5,262,860 A | 11/1993 | Fitzpatrick et al. |
| 5,285,278 A | 2/1994 | Holman |
| 5,353,283 A * | 10/1994 | Tsuchiya .................... 370/392 |
| 5,438,355 A | 8/1995 | Palmer |
| 5,453,794 A | 9/1995 | Ezaki ......................... 348/461 |
| 5,479,268 A | 12/1995 | Young |
| 5,481,542 A | 1/1996 | Logston et al. ................ 348/7 |
| 5,526,035 A | 6/1996 | Lappington et al. .......... 348/13 |
| 5,534,913 A | 7/1996 | Majeti et al. .................. 348/7 |
| 5,537,141 A | 7/1996 | Harper et al. ................. 348/12 |
| 5,539,471 A | 7/1996 | Myhrvold et al. .......... 348/473 |
| 5,543,849 A | 8/1996 | Long .......................... 348/460 |
| 5,553,221 A | 9/1996 | Reimer et al. .............. 345/333 |
| 5,564,073 A | 10/1996 | Takahisa ...................... 455/66 |
| 5,570,295 A | 10/1996 | Isenberg et al. |
| 5,572,442 A | 11/1996 | Schulhof et al. |
| 5,585,858 A | 12/1996 | Harper etal. ............... 348/485 |
| 5,589,892 A | 12/1996 | Knee et al. ................. 348/731 |
| 5,604,542 A | 2/1997 | Dedrick |
| 5,612,730 A | 3/1997 | Lewis |
| 5,633,918 A | 5/1997 | Mankovitz ............... 379/93.24 |
| 5,640,193 A | 6/1997 | Wellner |
| 5,643,088 A | 7/1997 | Vaughn et al. ................ 463/40 |
| 5,649,284 A | 7/1997 | Yoshinobu .................. 455/5.1 |
| 5,659,366 A | 8/1997 | Kerman ...................... 348/460 |
| 5,668,592 A | 9/1997 | Spaulding, II ............... 348/13 |
| 5,677,708 A | 10/1997 | Matthews, III et al. ...... 345/115 |
| 5,686,954 A * | 11/1997 | Yoshinobu et al. ........... 348/13 |
| 5,694,163 A | 12/1997 | Harrison ...................... 348/13 |
| 5,696,905 A | 12/1997 | Reimer et al. ................ 705/27 |
| 5,710,884 A | 1/1998 | Dedrick ................. 395/200.47 |
| 5,724,091 A | 3/1998 | Freeman et al. ............. 348/13 |
| 5,724,103 A | 3/1998 | Batchelor .................. 348/553 |
| 5,729,252 A | 3/1998 | Fraser ........................ 345/302 |
| 5,734,413 A | 3/1998 | Lappington et al. .......... 348/12 |
| 5,734,437 A | 3/1998 | Back .......................... 348/563 |
| 5,761,602 A | 6/1998 | Wagner et al. ............... 455/3.1 |
| 5,761,606 A | 6/1998 | Wolzien ..................... 455/6.2 |
| 5,774,664 A | 6/1998 | Hidary et al. .............. 709/218 |
| 5,778,181 A | 7/1998 | Hidary et al. .............. 709/218 |
| 5,782,692 A | 7/1998 | Stelovsky ...................... 463/1 |
| 5,793,365 A * | 8/1998 | Tang et al. ................. 345/329 |
| 5,818,441 A | 10/1998 | Throckmorton et al. |
| 5,892,909 A * | 4/1999 | Grasso et al. ............... 709/201 |
| 5,905,865 A * | 5/1999 | Palmer et al. ............... 455/3.1 |
| 5,912,700 A | 6/1999 | Honey et al. |
| 5,940,082 A * | 8/1999 | Brinegar et al ............. 345/442 |
| 6,018,768 A | 1/2000 | Ullman et al. .............. 709/218 |
| 6,029,195 A * | 2/2000 | Herz .......................... 709/219 |
| 6,122,658 A * | 9/2000 | Chaddha ..................... 709/203 |
| 6,131,120 A * | 10/2000 | Reid .......................... 709/225 |

OTHER PUBLICATIONS

Per Einar Dybvik and Hakon W. Lie, *Combining WWW/Mosaic with Realtime Multimedia Conferencing in Distance Education*, The Second International WWW Conference '94, Mosaic and the Web, Advance Proceedings, vol. 1, Oct. 17–20, 1994, at 423.

Tak K. Woo and Michael J. Rees, *A Synchronous Collaboration Tool for the World–Wide Web*, The Second International WWW Conference '94, Mosaic and the Web, Advance Proceedings, vol. 1, Oct. 17–20, 1994, at 315.

The Intercast Industry Group, *Frequently Asked Questions*, The Intercast Industry Group, Fall 1996, pp. 1–7.

"Web TV over Digital Cable"; Author=Dale Cripps; May 4, 1998; http://web–star.com/hdtvnews/webtvoverdigitalcable.html; pp. 1–4.

"Internet TV Advertising"; Author=Dale Cripps; May 8, 1998; http://web–star.com/hdtvnews/internettvadvertising.html; pp. 1–3.

"Gates, TV, Interactivity"; Author=Dale Cripps; May 5, 1998; pp. 1–4; http://web–star.com/hdtvnews/gatestvinteractivity.html.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

"Microsoft Web TV" brochure; copyright 1998 by WebTV Networks, Inc.; 16 pages.

\* cited by examiner

SOFTWARE DESIGN

Fig. 7

ENHANCED VIDEO PROGRAMMING SYSTEM AND METHOD FOR PROVIDING A DISTRIBUTED COMMUNITY NETWORK

REFERENCE TO RELATED APPLICATIONS

This application is a continuation-in-part of U.S. application Ser. No. 09/109,945, filed Jul. 6, 1998, entitled "ENHANCED VIDEO PROGRAMMING SYSTEM AND METHOD FOR INCORPORATING AND DISPLAYING RETRIEVED INTEGRATED INTERNET INFORMATION SEGMENTS," now U.S. Pat. No. 6,018,768 which is a continuation-in-part of U.S. application Ser. No. 08/615,143, filed Mar. 14, 1996, entitled by "ENHANCED VIDEO PROGRAMMING SYSTEM AND METHOD FOR INCORPORATING AND DISPLAYING RETRIEVED INTEGRATED INTERNET INFORMATION SEGMENTS," now U.S. Pat. No. 5,778,181 which is a continuation-in-part of U.S. application Ser. No. 08/613,144, filed Mar. 8, 1996, entitled "INTEGRATED INTERACTIVE VIDEO AND INTERNET SYSTEM" now abandoned, and is related to U.S. application Ser. No. 08/622,474 filed Mar. 25, 1996, now U.S. Pat. No. 5,774,664, all of which are incorporated herein by reference.

BACKGROUND OF THE INVENTION

Today, the capabilities of computers to provide massive amounts of educational and entertainment information has exploded with the Internet. The Internet has the power to transform society through unprecedented levels of information flow between members. Currently, on-line systems offer a variety of different services to users, including news feeds, electronic databases (either searchable by the user directly on the on-line system, or downloadable to the user's own computer), private message services, electronic newsletters, real time games for play by several users at the same time, and job placement services, to name a few. However, today, most on-line communications occur merely through text. This currently stands in great contrast to the audio/visual presentation of the alternative electronic medium, television. However, it is expected that as multi-media's incessant growth continues, audio/visual programs will proliferate and text will become less and less dominant in the on-line environment. Even though these programs will be introduced, the Internet, will remain essentially user unfriendly due to its very massiveness, organization, and randomness. Simply stated, there is no order or direction in the Internet. Specific pieces of information are many times hard to find, and harder yet, is the ability to put that piece of information into a meaningful context.

Television, on the other hand, has been criticized for being a passive medium—"chewing gum for the eyes," as Fred Allen once observed. Television has always been something you watched, not something you do. Many social critics believe that the passivity television depends on has seeped into our entire culture, turning a nation of citizens into a nation of viewers. While interactive television systems have increased the level of user interaction, and thus, provided greater learning and entertainment opportunities, vast information resources such as databases are inaccessible from such a medium.

What is needed is a means to close the gap between video programming and the information superhighway of the Internet. What is needed is a wider, richer experience integrating audio/visual and textual database elements into an organized unique interactive, educational, entertainment experience. Currently, the Internet is a repository of information on virtually any subject. However, what is needed is a mechanism for combining the user-friendly visual experience of television with the vast information resources of the Internet. What is further needed is a system and method for distributing content with that mechanism combining television programming with Internet resources.

SUMMARY OF THE INVENTION

Systems consistent with the present invention combine broadcast television programming and/or video programming which appears on a VHS or Beta tape, CD-ROM, DVD or other medium, or particular content from the Internet, or video programming at a video server (hereinafter "video programming") with the massive Internet, creating a new and powerful educational and entertainment medium. The system allows consumers to receive more information in a more efficient manner than either television or the Internet alone. Consumers not only can see a news report on television, but they can also read pertinent information about the report, as well as explore related information about the story. The program becomes the introduction to a particular subject, rather than the entire subject itself. The act of viewing a program has now become a more engaging, enriching experience.

The system can also create a more intimate relationship between the viewer and the program. The user might be solving problems or performing virtual experiments on the Internet site that a teacher is discussing in an educational television program. Similarly, the consumer might be solving problems that the fictional characters in a television program must solve. In both cases, the consumer is an active participant in the process, rather than a passive observer.

Instead of an undirected and unfocused exploration of Internet sites, by synching specific Internet pages to the video signal, the system puts the Internet in context. The television program producers now can decide what additional information to offer their audience. This material can now be seen in the context of the television program.

An additional advantage is that consumers don't have to search through the literally hundreds of millions of pages on the Internet to find appropriate material. The material has already been filtered by the program producers and delivered to the consumer automatically.

Another advantage of the system is that it changes the nature of advertising. Since additional information can be given to consumers automatically, advertising can now be more substantive, allowing customers to make more informed choices. Now, the act of purchasing a product seen on television can be streamlined—the consumer can be given the choice of buying the product instantly using the two-way capabilities of the system.

In addition, users can take advantage of the two-way capabilities of the Internet to respond to polls, to send e-mail or to link to additional sites. For example, a viewer watching a television news program, through the system of the invention, can receive a stream of Web pages which provide additional, specific information relating to the news content—whether background on the Presidential primaries or the latest change in interest rates.

The video programming and corresponding Internet pages can be viewed on personal computers equipped with a television card, but the open software-based approach enables anyone with a television set and JAVA enabled PC to experience the system of the invention.

By marrying the appeal of video with the two-way data transfer capabilities of the Internet, the system creates a powerful new medium: Video producers and Internet site creators can enhance their content to extend their brand identity and differentiate their program offerings to the millions of people who are spending more time navigating through the resources of the World Wide Web rather than watching television; advertisers can speak more directly to consumers by directly sending Web pages to the consumer instead of only displaying Web addresses in their commercials; and consumers can gain a new level of interest and interactivity over a video-based medium. In addition to providing significant and immediate benefits to broadcasters and advertisers, the system will also present educational programmers with a way to more effectively use Internet resources in the classroom.

Recently, several media companies have joined to create a system for linking the Internet and television on the personal computer, called "Intercast." In this system, content will be provided simultaneously with the TV video signal. This system, however, requires that stripped down Web pages be sent in the vertical blanking interval (VBI) of the video signal, using up to three scan lines limiting effective bandwidth to approximately 28.8 kbps. This approach, however, requires specialized hardware to both insert the Web pages into the VBI and extract these codes at each PC since it takes up to three scan lines of the VBI. Thus, the complexity and cost of the PC is increased. Because the Web pages are transmitted with the video signal, the Intercast system is not a true "two-way" system, but merely a one-way "piggyback" system. In addition, the Intercast is an analog video product, and thus, cannot handle digital video data.

Systems consistent with the present invention, on the other hand, are much more flexible, but less complex, systems. The systems support either analog or digital television broadcasts without broadcasters or end-users having to alter their existing systems, thus enabling broadcasters to reach a wide audience within a short time.

In one embodiment, the actual Web pages are not forced into the very limited bandwidth of the vertical blanking interval (VBI). Instead, merely eight fields of line 21 of the VBI are used to deliver the relevant Internet Web page addresses to the PC. These addresses are called "uniform resource locators" (URLs). The system then directs the particular Web browser to retrieve the identified Web pages from the Internet. Upon receipt of the particular Web page (s), the system syncs the Web page(s) to the video signal, and at the appropriate times, presents the Web pages on one portion of the computer screen with the television video signal, shown in a window on another portion of the screen, and thus, provides the synergistic Internet and television experience. One of the advantages of the system of the present invention is that no specialized chip set need be produced and implemented into the standard PC. Thus, complexity is kept to a minimum.

In another embodiment of the present invention, the VBI is not used to transmit the URLs to the user. In this alternative embodiment, member broadcasters enter the Internet through a member account, and will be provided with a graphical user interface for pre-scheduling Internet addresses, or URLs, for transmission to users at particular times of day. This interface could also be used to transmit real time live transmissions of URLs to users at the same time as a broadcast. The URLs are stored in a "Link File" for later transmission over the Internet to the user at the broadcasters entered time, which corresponds to the broadcast time of an associated program. The timing of URLs could be determined in advance or can be sent out live. This embodiment eliminates the need to place the URLs in the VBI, and also allows the broadcaster to store more than one Link File for transmission to users in different time zones, for example. Further, more than one broadcaster could access the same master schedule if desired, and add or delete certain URLs to personalize the program for their local audiences. Also, personalization can be taken to the single user, or small group of users, by having the system send a different stream of URLs to each user, depending on a unique user profile, for example. Thus, the personalization feature of this embodiment allows each user to receive information uniquely relevant to their interests, demographics, history, etc. This embodiment makes the transmission of URLs to the user even less complex than other embodiments disclosed herein.

Another embodiment permits dynamic reconfiguration of a network for transmitting content, such as that located using the URLs. The network referred to as a distributed community network, includes hubs that may logically reside on any machine and provide control of routing packets containing the content. By using hubs to assist in routing of packets, the burden of routing control at a corresponding server is decreased, enhancing the reliability and efficiency of the network in transmitting content and permitting access to content.

Thus, embodiments consistent with the present invention provide order and direction to the Internet by using television signals to place, orient and control such information in a meaningful context. They also create a more intimate relationship between the viewer and the program by enriching the learning experience through the provision of more in-depth information.

Methods and apparatus consistent with the present invention distribute functions for routing packets of information among multiple machines in a network. The machines include hubs for implementing routing functionality. The hubs receive the packets and, based upon information in the packets, determine target machines or other network entities for receiving the packet.

The methods and apparatus, in particular, transmit content associated with a media program to a user machine. They receive from the user machine a packet including an indication of hierarchical routing information and content using a particular service, and they determine targets for receiving the packet based upon the hierarchical routing information. Based upon the determination, the packet is transmitted to the targets.

BRIEF DESCRIPTION OF THE DRAWINGS

FIG. 7 is a diagram of a user interface illustrating a playlist.

DETAILED DESCRIPTION

Video Programming System and Method

Figure 1:
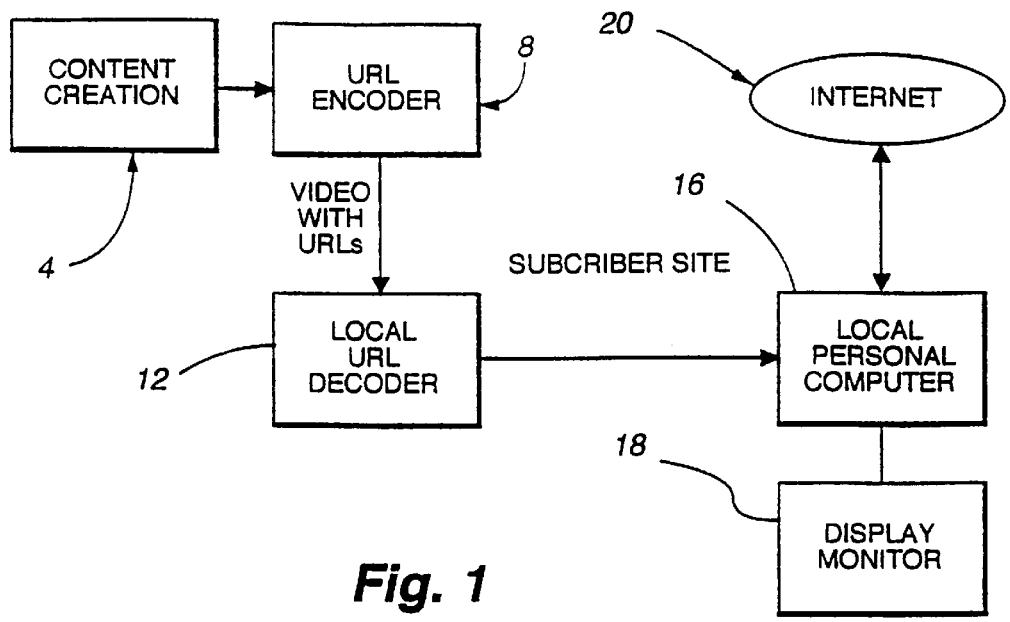
FIG. 1 is a diagram of the system design, showing the receipt and decoding of video signals at the subscriber location using the method of the present invention.

One system consistent with the present invention combines the rich visual capabilities of video with the vast resources of the Internet. As shown in FIG. 1, an embodiment of the invention is a computer based system for receiving a video program along with embedded uniform resource locators (URLs)—which direct the user's computer 16 to address locations, or Web sites, on the Internet 20 to retrieve related Web pages. These Web pages correspond to the video presentation. The particular video programming can be delivered in analog, digital or digitally compressed formats (e.g., MPEG2) via any transmission means, including satellite, cable, wire, television broadcast or sent via the Web.

The video programming is preferably created at a centralized location, i.e., content creation 4 as shown in FIG. 1, for distribution to subscribers in their homes, for example. Program creation is accomplished according to any conventional means known in the art. After a video program is created, uniform resource locators are embedded, in one embodiment, into the vertical blank interval of the video programming by the URL encoder 8, shown in FIG. 1. In this embodiment, the URLs are encoded onto eight fields of line 21 of the VBI. Line 21 is the line associated with close captioning, among other things. However, the URLs could also be embedded in other fields of the VBL in the horizontal portion of the video, as part of the audio channel, in any subcarrier to the video, or if digital, in one of the data fields.

Although FIG. 1 shows the video with URLs over the same transmission line, the URLs can be sent down independently of the video program on a data channel. In this embodiment, the URLs can be forwarded to the remote sites either prior to initiation or during the program. Preferably, the URLs have associated time stamps which indicate to the subscriber stations when, during the video program, to display the particular Web pages addressed by the URLs. Alternatively, the user can select when to call the particular Web pages for display with the video program.

The particular information in line 21 is not part of the visual part of the program, and thus, is not perceptible to the human eye, thereby making it ideal to send data information to the users. While the bandwidth capacity of line 21 is limited, because the system transmits only the uniform resource locators (URLs), and not full Web pages, there is more than enough capacity. Furthermore, no additional hardware is necessary at the PC 16 to implement the elements of the present invention. Thus, the present invention has the additional advantages of being very efficient and takes advantage of conventional hardware.

Once the video program is created, it can be transmitted to user sites over any transmission means, including broadcast, cable, satellite, or Internet, and may reside on video servers. Furthermore, the video program, with or without embedded URLs, can be encoded on a VHS or Beta tape, DVD or other medium.

Preferably, each receiver station comprises any Intel x86 machine (preferably a 486 processor, pentium processor, etc.), an Apple Computer, UNIX or any other type of standard computer workstation. The local PC 16 is preferably connected to either a cable and/or broadcast television connection or to a local VCR or other video source. At each subscriber site, the local personal computer 16 preferably receives the cable transmission by cable connection on the back of the personal computer 16. The video/audio program can then be processed for display on the computer screen using any conventional PC card capable of displaying NTSC signals on a computer monitor, such as a WinTV card. In addition to the cable connection, however, in the present invention there is also an Internet 20 connection created concurrently with the cable connection.

The Internet 20 connection can be via high-speed line, RF, conventional modem or by way of two-way cable carrying the video programming. The local PC 16 has Internet access via any of the current ASCII software mechanisms. In one embodiment, at each subscriber home, an associated local URL decoder 12 receives the cable video television program, as shown in FIG. 1. The local URL decoder 12 extracts the URLs, preferably embedded in the vertical blanking interval, with the use of any conventional VBI decoder device. The URL decoder 12 may be either a stand-alone unit or a card which is implemented into the personal computer 16.

Figure 2:
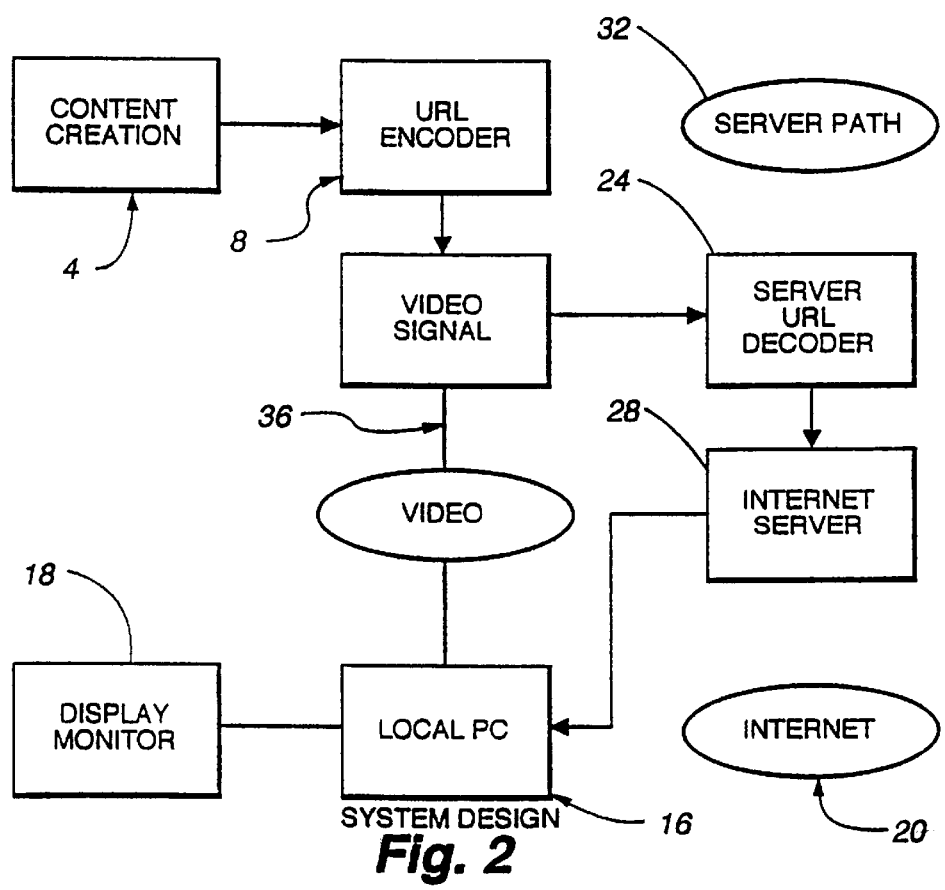
FIG. 2 is a diagram showing an alternative system embodiment to achieve the integration of the Internet information with the video content by decoding the uniform resource locators at a server site and then transmitting the URLs to the subscriber stations via the Internet.

In another embodiment shown in FIG. 2, the uniform resource locators (URLs) are encoded into the video in the same manner as described above. Again, the URLs are preferably encoded onto eight fields of line 21 of the VBI, but may also be sent independently of the video. In this embodiment, the URL decoder 24 is located at the server site, as opposed to the subscriber location. When the decoder 24 receives the video program signal, it strips out the URL codes on line 21 of the VBI and delivers these codes independently to an Internet server 28. The URL code is then subsequently delivered over the Internet 20 to the user PC 16. Simultaneously, the video is broadcast over conventional broadcast or cable transmission means 36 to the user's personal computer 16.

Figure 4:
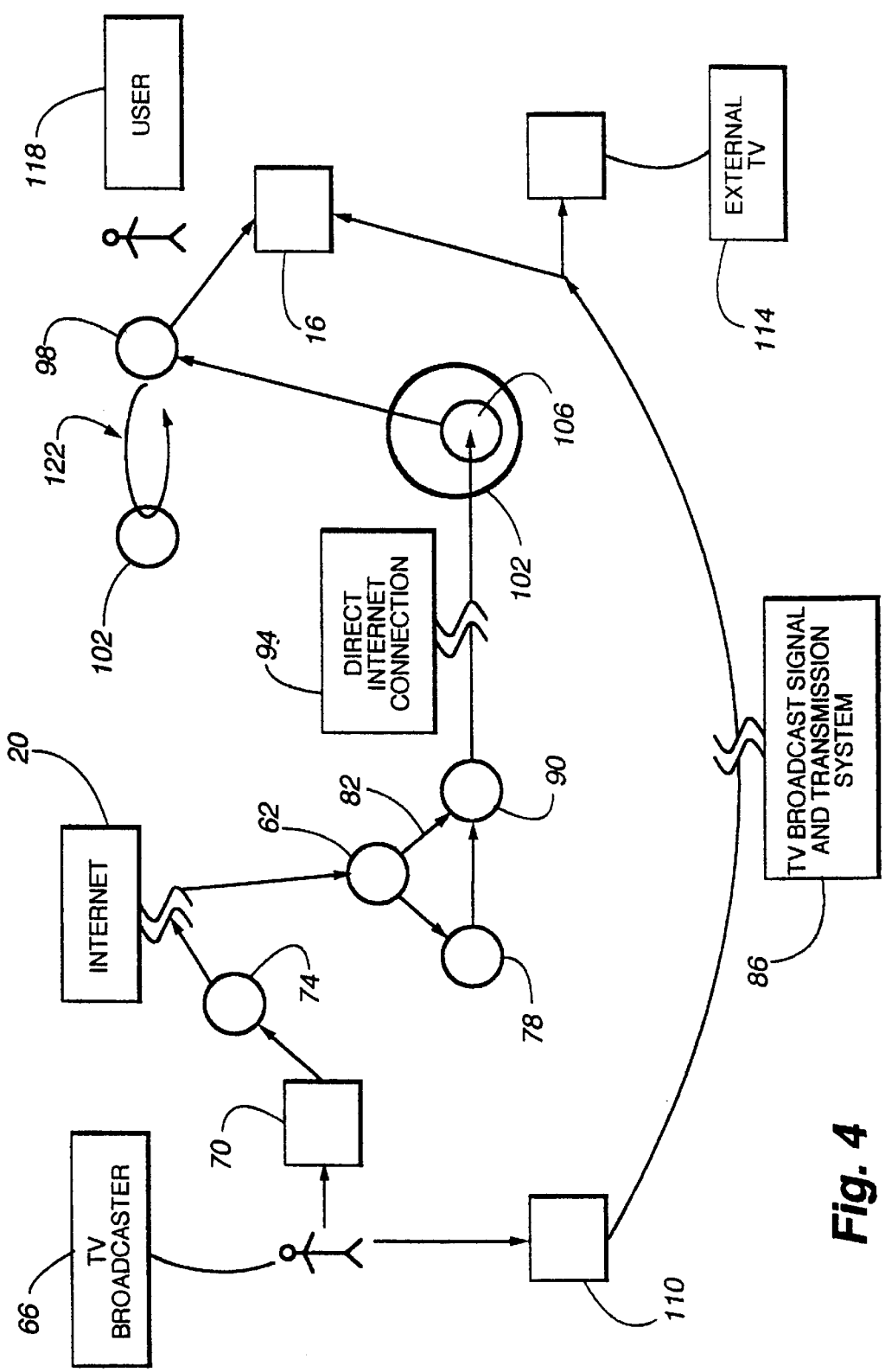
FIG. 4 is a diagram showing another system embodiment to achieve the direct transmission of URLs over the Internet to the user at a broadcaster's entered time without encoding the URLs into the VBI.

Another embodiment of the system, shown in FIG. 4, does not depend on, or even use, the VBI. In this embodiment, the system will run an online service over the Internet 20. This service will be in the form of an Internet Web site 62 that provides a user-interface to a database 78 and to one or more associated data servers 90. The service will provide member-accounts to TV broadcasters 66 who sign up to use the system of the invention in conjunction with their broadcasts. Each member broadcaster will enter the service at their computer 70 through Web browser software 74 using their member account by entering various identification and password information. Once within their account, the member will be provided with a graphical user interface for pre-scheduling URLs for transmission to users 118 over a direct Internet connection 94 at particular times of day. The same user interface, or a variation on it, can be used by broadcasters for live transmission 82 of URLs to users at the same time as a broadcast 86.

For example, one example of this interface might be a scheduling calendar (daily, weekly, monthly, yearly) in which the broadcaster 66 may allocate time periods which coincide with their broadcasts 86, and during which they will send out URLs to their users to link to Web pages. For each time period (for example, a particular hour long period during the day) determined by the broadcaster 66 to be a broadcast period (a period during which they want to transmit URLs that correspond to a television show being broadcast from their TV broadcast facility 110 to the external TV 114 of the user 118 at that time), the broadcaster 66 may then enter a series of URLs into an associated file ("Link File") for transmission over the Internet 20 at that time. This Link File might have a user interface such as a spreadsheet, table, or list, or it could be simply a tab-delimited or paragraph-delimited text-file. As an example, each of the records in the Link File consists of a data structure which could contain information such as:

(<timecode>,<URL>,label or title>,<additional information>,<additional information>, . . . )

The above data structure is just one example. The records in the Link File preferably specify the time, Internet address (i.e. URL), label (such as an associated name), and some optional additional information, for each Web page the broadcaster 66 desires to launch during a show.

When a broadcaster 66 modifies their calendar and/or the Link File associated with any given time period(s) in their calendar, this information is saved into the database 78 that is attached to the site 62. Each broadcaster 66 may maintain multiple calendars in the database 78 if they broadcast in different time zones, for example.

The database 78 provides the Link File records for upcoming time periods to a server 90, which may be one server or a distributed network of server programs on multiple computers across the network, to be utilized for scaling to large national or global audiences. The server 90 provides the Link File records, including the URLs, to the user's personal computer 16, which is connected via a network. Examples of possible networks include the public Internet 94, a direct private network, or even a wireless network.

One feature of the above embodiment is that one or more broadcasters 66 may utilize the same schedule in the database 78 for their own broadcasts 86 or during the same broadcast. For example, a network broadcaster may develop a master schedule and various affiliate broadcasters may subscribe to that schedule or copy it (in the database) and add or delete specific URLs in the schedule for their local audiences or unique programming. This scheme enables affiliates to insert URLs for local advertisers or local subjects into a sequence of more general URLs provided by their network broadcaster 66. In other words, the affiliate can add links that ride on the network feed and then redistribute it to their local audiences.

This embodiment can also enable personalization in the form of unique series of URLs specific to each user's unique profile, which is directly sent over the Internet 20 to each users specific client software 106. This can be achieved from the broadcaster 66 to each individual user 118, or to particular collections of users. To accomplish personalization, the service may send a different stream of URLs to each user's client software program 106. The stream of URLs sent would depend on a user profile stored in the database 78 or the client software program 106, a user profile which is built on demand or over time for each user 118 based on criteria such as the location of the user, choices the user makes while using a client software program 106, or choices the broadcaster 66 makes during a broadcast 86, or automatic choices made by an algorithm (such as a filter) residing on the service 62. Personalization enables each user to receive URLs which are uniquely relevant to their interests, demographics, history, or behavior in the system.

System Operation

Once the URLs have reached the personal computer 16, system operation is similar for all of the embodiments diagramed in FIGS. 1, 2, and 4.

Figure 3:
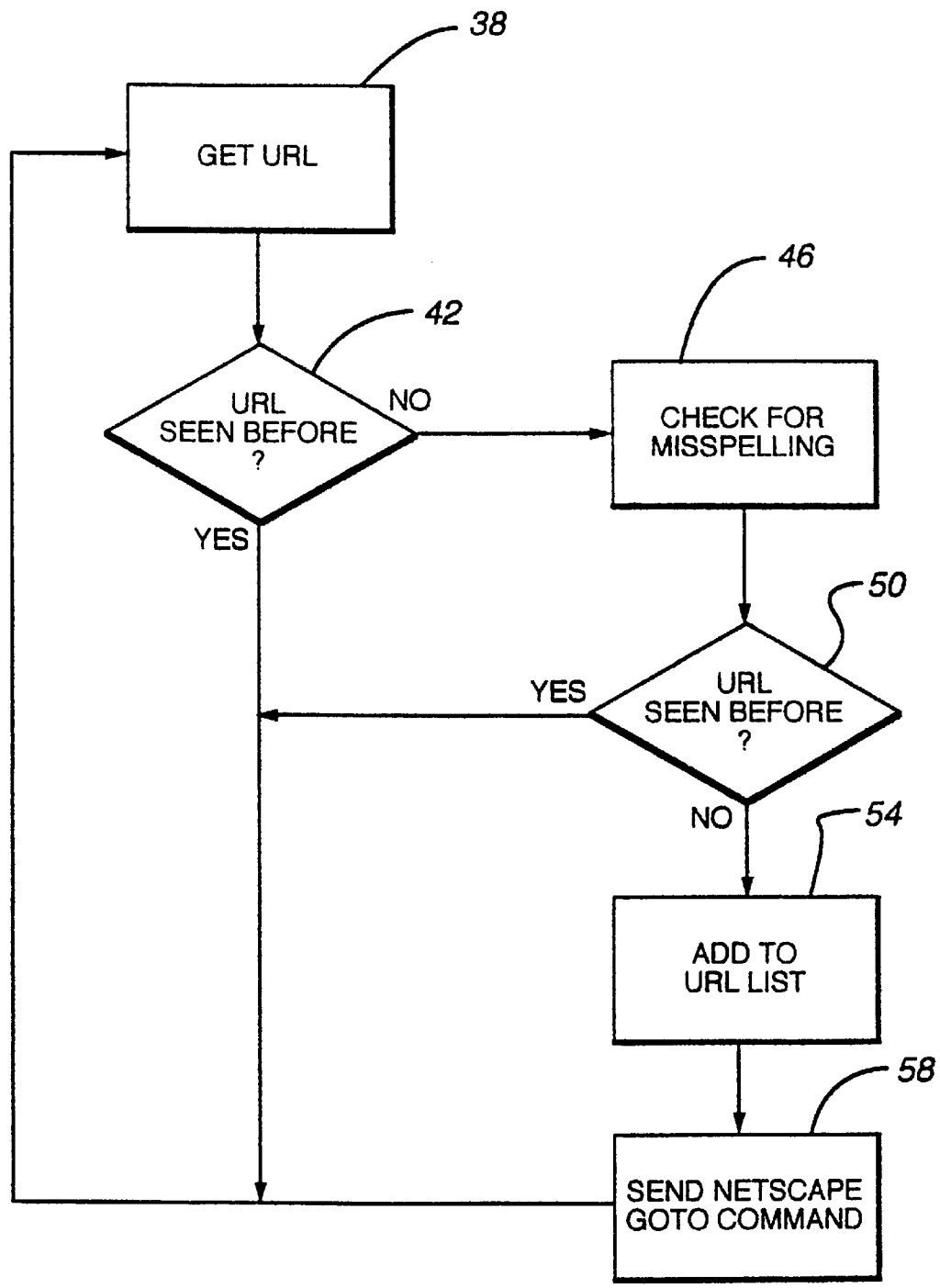
FIG. 3 is a flow diagram of the basic software design of the present invention.

In one embodiment, a JAVA enabled browser 98 as well as specialized software 106 for performing part of the method of the present invention are installed on the computer 16. The JAVA enabled browser 98 allows the computer 16 to retrieve the Web pages 102 and is preferred software, since it is platform independent, and thus, enables efficient and flexible transfer of programs, images, etc., over the Internet 20. The specialized interface software 106 (hereinafter, "client software"), attached as Appendix A, acts as an interface between the video programming and the Internet functions of the present invention. The client software 106 retrieves URLs from the video program (embodiment of FIG. 1) or directly from the Internet connection (embodiments of FIGS. 2 and 4), interprets these URLs and directs the JAVA enabled browser 98 to retrieve the particular relevant Web pages 102, and synchronizes the retrieved Web pages to the video content for display on the user's computer 16, as shown in FIGS. 3 and 4 and explained in more detail below.

In one method, the URLs are encoded and embedded into the video signal by inserting them into the vertical blanking interval (VBI), as mentioned above.

In another embodiment, the URLs are entered by member TV broadcasters 66 along with specified times for transmitting the URLs to the user. At the appropriate times, the URLs are sent directly over the Internet to the user's PC 16 via the client software 106 over a direct point-to-point or multicasting connection.

One method of the present invention has the capability to detect identical URLs sent directly after one another which causes the browser not to fetch URLs in these particular cases. As shown in FIG. 3, once the URL code is received at the computer, the client software 106 first interprets the URL and determines in step 42 whether the particular URL has been received previously. If it has already been received, the next received URL is interpreted for determination of prior receipt. If the particular URL has not been detected before, the software checks for misspelling in step 46 and any other errors, and if errors exist, corrects these particular errors. Once again, it is determined whether the URL has been previously detected. If it has, the next URL is accessed in step 38. If the URL has not been detected, the specific URL is added to the URL list in step 54. The specific URL is then sent to the Web browser, preferably a JAVA enabled browser 98. Upon receipt of the URL, the browser 98, in step 58, will access the Web site address 122 (FIG. 4) indicated by the URL and retrieve the cited Web page(s) 102 via the Internet.

Viewers can view the integrated presentation in the following manner. As mentioned above, the video signal is processed and displayed on a video window on the PC screen using a WinTV card, for example. The corresponding audio is forwarded to the audio card and sent to the PC speakers.

The actual retrieved Web pages 102, referenced by the URL, are optionally time stamped to be displayed on the computer screen when predetermined related video content is displayed in the video window, thus, enlightening and enhancing the video presentation by providing in-depth information related to the video content thereto. Another section on the screen is also preferably used to represent an operational control panel. This control panel provides a list of the URLs that have been broadcast and correspondingly received by the computer 16. This control panel is updated to add a URL code each time a new URL code is received by the PC 16. This list gives the subscriber the flexibility to go back and retrieve particularly informative or interesting Web pages that have already been displayed earlier in the program, or alternatively, to print them out for future reference. Furthermore, the list could include URLs referring to Web pages not displayed with the broadcast program, but that provide further information on a certain topic of interest to the viewer.

An exemplary implementation of the present invention can best be understood with reference to an example. A viewer can begin watching a musical video featuring a new band, for example. As the video is received by the PC 16, URLs are either being received with the video signal or are being received directly via the Internet 20 or another data channel, and are being interpreted by the client software 106. Upon direction and command, the JAVA enabled browser 98 retrieves particular Web pages 102 from Internet 20 Web sites identified in the URLs. These Web pages 102 will then be displayed on the video screen at particular times. Thus, for example, while the viewer is watching the music video, biographical information on the band can also be displayed adjacently to the video window. Web pages 102 could also include an upcoming concert schedule, or even audio clips of the band's music may be downloaded from the Internet 20. As another example, a user could be watching a program relating to financial news. While the narrator is shown discussing high tech stocks, Web pages corresponding to detailed financial performance information on high tech stocks, environment and characteristics can be displayed with the video on the computer screen. If the personalization features are included, Web pages associated with a particular user's stock can be fetched and displayed on the computer screen with the video program. When the program narrator switches to a discussion on the weekly performance of the Dow Jones, Web pages presenting related financial performance information can be simultaneously displayed. Thus, it is evident that the present invention profoundly enriches the viewing and learning experience.

It is understood that there can exist alternative embodiments for use with the present invention. For example, the user can view the interactive program using a television set 114 or other display monitor in conjunction with the display screen of the personal computer 16. In this embodiment, the relevant Web pages are shown on the personal computer 16 while the video program is displayed on the television monitor 114. In this alternative embodiment, a cable set top box receives the television program from the multichannel cable. The personal computer 16 also receives the video program from the multi-channel cable and extracts the URLs, embedded in the vertical blanking interval of the video signal or directly transmitted 94 over the Internet 20. The client software 106 extracts the URLs and retrieves the particular Web pages as described above. The Web pages are then synchronized with the particular video frames and presented to the user. It is understood that a hyperlink may exist on the Web site that will allow the user to automatically load the client software and call up the specific television channel referenced in the Web site. For example, someone browsing the Internet 20 may come upon a major television network's Web site. They scroll to an interesting story then click on an hyperlink to turn on the software which tunes the TV window to the network to enhance the information residing at the Web site.

Furthermore, instead of receiving the video program from a transmission means, the video program can be addressed directly from the user site if the video program, with or without embedded URLs, is stored on a VHS, Beta, DVD or other medium. In this embodiment, the user PC 16 and/or television 114 are connected to a VCR, DVD player or other appropriate device.

Figure 5:
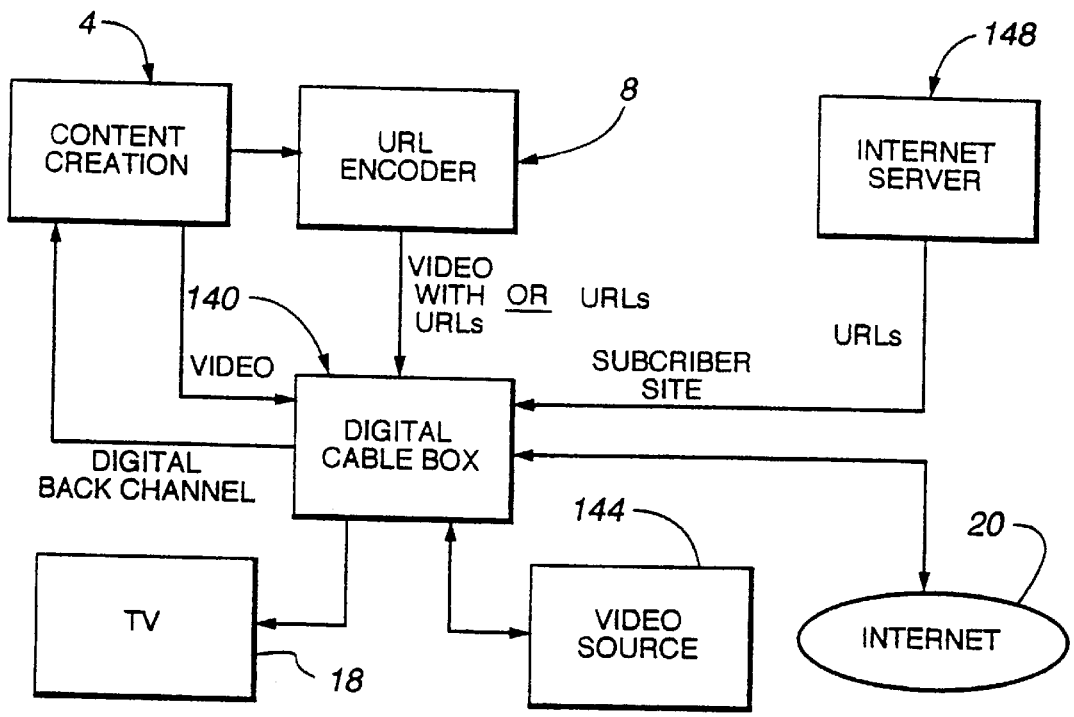
FIG. 5 is a diagram of another embodiment including a digital cable box.
Figure 6:
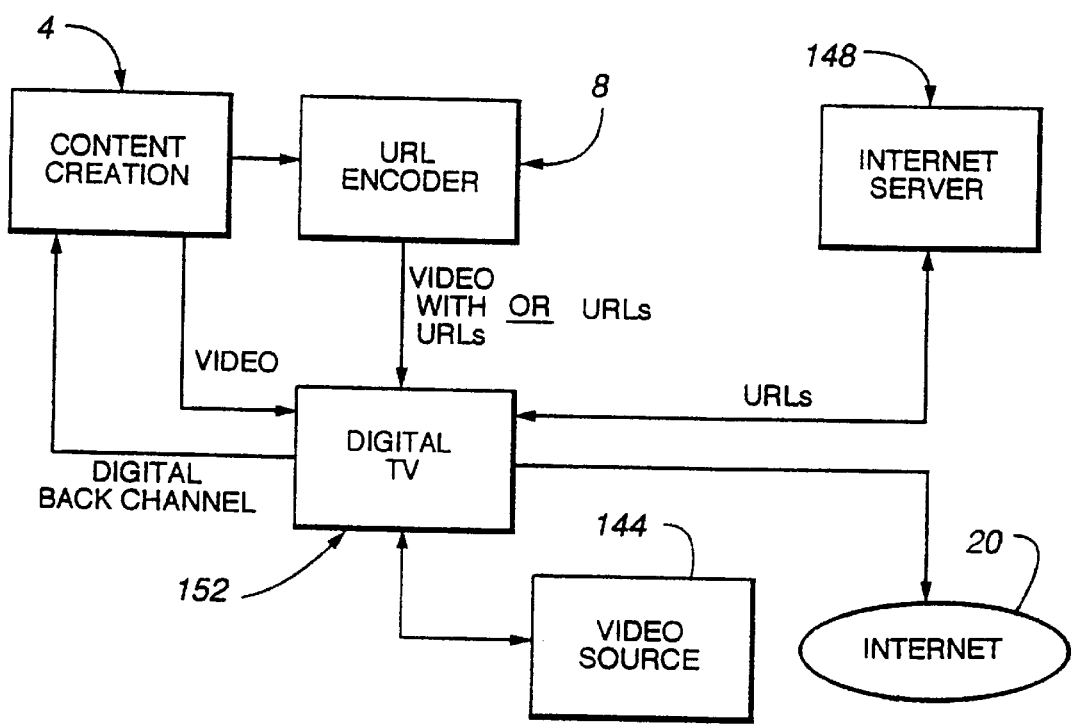
FIG. 6 is a diagram of another embodiment including a digital T.V.

FIGS. 5 and 6 show two alternative embodiments for use with the present invention. For example, the user can view the interactive program using a television set 18 or other display monitor in conjunction with a digital cable box 140, as shown in FIG. 5. In this embodiment, the digital cable box 140 performs the functions of the personal computer 16 shown in FIGS. 1, 2 and 4. In the embodiment shown in FIG. 5, the client software is stored in memory in the digital cable box 140. In one embodiment, the digital cable box 140 includes two tuners, thus allowing both the Web Page and the Video program to be simultaneously viewed on the same screen. If Video and Webstream, however, are carried on one channel, then only one tuner is necessary.

The client software retrieves URLs from the received video program, directly from the Internet connection 20 or via a separate data channel, interprets these URLs and directs the Web enabled browser to retrieve the particular relevant Web pages, and synchronizes the retrieved Web pages to the video content for display on the television 18, as shown in FIG. 5. In this embodiment, the relevant Web pages are preferably shown in one frame of the television 18 while the video program is displayed in another frame. Alternatively, the web page can replace the video program on the display.

In this alternative embodiment, the digital cable set top box 140 receives the television program from the multichannel cable. The URLs can be encoded into the digital program channel using MPEG 1, MPEG2, MPEG4, MPEG7 or any other compression video scheme. Alternatively, the URLs can be transmitted to the digital cable boxes 140 from an Internet server 148. The digital cable box 140 decodes the URLs from the digital video signal or directly transmitted over the Internet 20. The client software decodes the URLs and retrieves the particular Web pages as described above. The Web pages are then preferably synchronized with the particular video frames and presented to the user.

As with all the embodiments described above, instead of receiving the video program from a transmission means, the video program can be addressed directly from a local video source 144 if the video program, with or without embedded URLs, is stored on a VHS, Beta, DVD or other medium. In this embodiment, the digital cable box 140 is connected to a VCR, DVD player or other appropriate device.

FIG. 6 discloses an embodiment where a digital TV 152 is the remote reception unit. In this embodiment, the digital TV 152 performs the functions of the personal computer, shown in FIGS. 1, 2 and 4, and the digital cable box 140 shown in FIG. 5. In the embodiment shown in FIG. 6, a processor means and memory are incorporated into the digital TV 152. Further, the client software and Web browser software are implemented into memory in the digital TV 152. All of the functions described above with reference to the other embodiments are performed in a similar manner by the digital TV 152 embodiment.

Although the digital cable box/TV 140, 18 and digital TV 152, shown in FIGS. 5 and 6, are incorporated into the embodiment of FIG. 1, in substitution for the PC 16, they also could be substituted for the PC 16 shown in FIGS. 2 and 4.

The user can view the video and web content on one screen (in two windows), or with the video on one display screen and the Web content on a separate display monitor. Alternatively, the user can access the video or web content separately. Thus, the user can branch from video to web content and vice versa.

Figure 7:
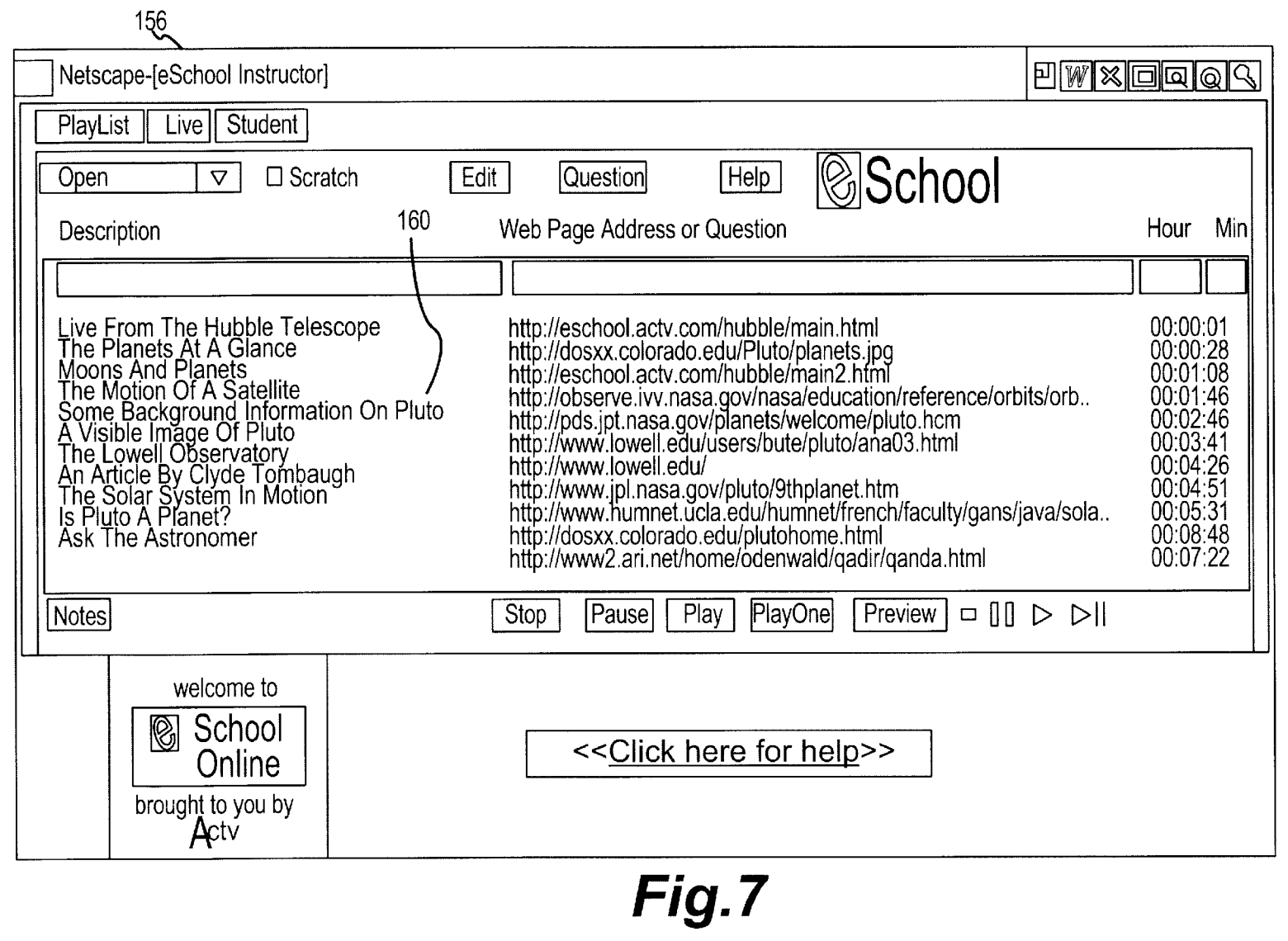

The present invention is well-suited to the education environment. In this embodiment, students and teachers access one or more Web servers. The software components include instructor and student user software, authoring software and database assessment software. In one such embodiment, an instructor uses content creation software on a personal computer to easily integrate into their curriculum current information published on the Web, through an easy to use interface 156 such as that shown in FIG. 7. The instructor creates a playlist (i.e. linkfile) 160, the playlist 160 comprising a listing of Web pages, text notes and questions. The Web sites and questions are set forth in a predetermined order and can be assigned times. Preferably, the URLs identifying the Web site and time stamps are sent automatically to the desktop of each student in the virtual community, either during playback of a pre-recorded program or during a live event.

At each of the student workstations, the program is directed by the playlist 160. In other words, the playlist 160 provides the structure for the program. At predetermined times as dictated by the playlist 160, the browser will go fetch and display a Web page in a frame on the computer screen. Because program events can be set up in this manner at predetermined times, the entire program and playlist can be prerecorded and stored in a Web database for later access by students.

A significant advantage of an embodiment for educational applications is that the students and the instructor can be located anywhere, as long as they are all connected to the Web. Because a server is essentially controlling the program, the instructor output comes from the server and the student workstations get automatically updated by the Web server.

Figure 8:
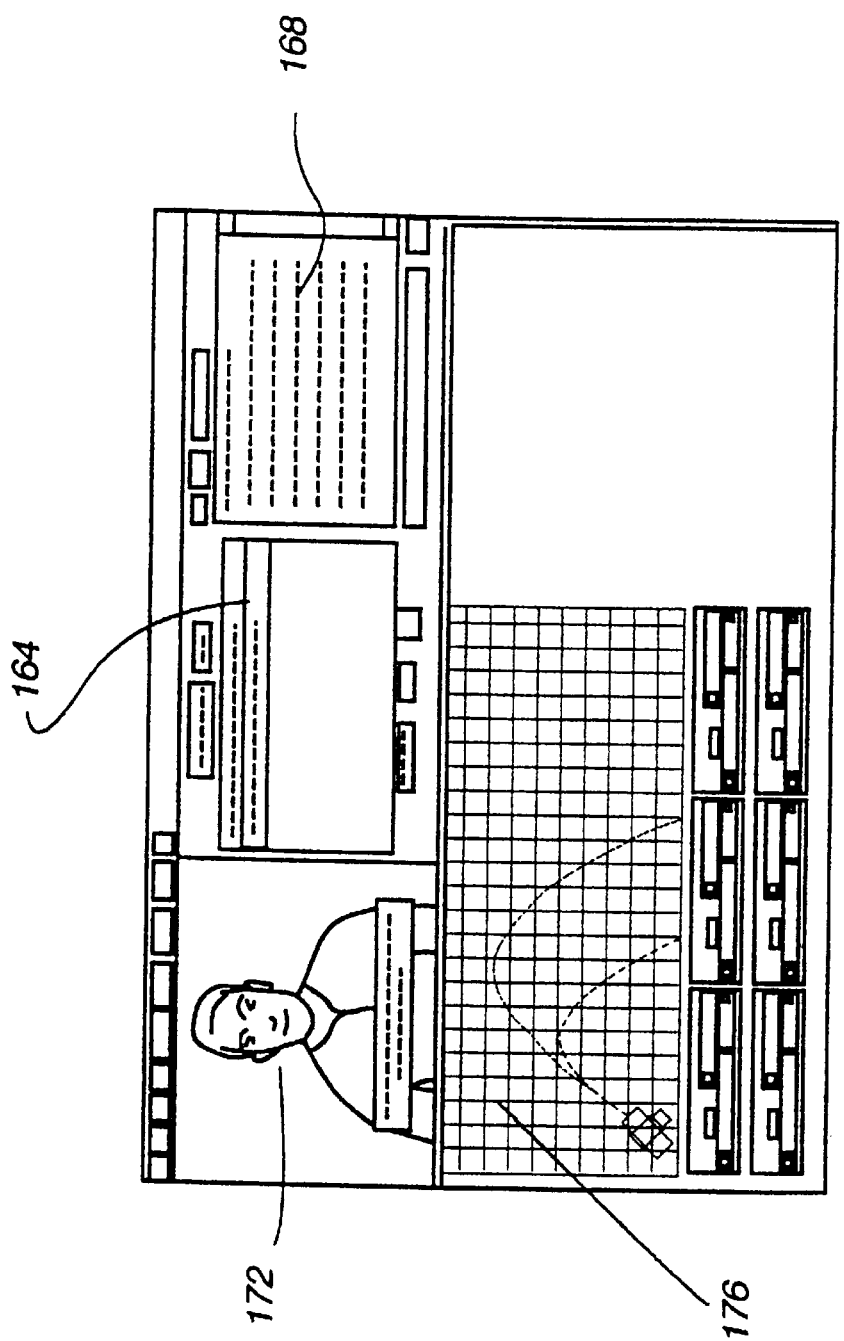
FIG. 8 is a sample display provided to a student of a lesson.

This educational embodiment integrates Web content and other media with collaborative groupware functionality to create an interactive environment for students and teachers. In this embodiment, the student can receive a traditional video lesson through a frame in his or her Web browser, or from a television. Simultaneously, the present invention provides separate frames, an example of which is shown in FIG. 8, in the browser displaying: (1)Web pages 176 automatically delivered to each student's desktop with information or exercises that complement the video presentation; (2) a chat dialogue frame 168 for conversing with the instructor and/or other students online; and (3), an interactive playlist 164 of Web pages and questions comprising the lesson.

In the student interface of FIG. 8, each student can perform a virtual experiment during a physics lesson to learn about gravity, for example. Further, the students are conversing with one another and the instructor in the chat dialogue frame 168. They may also send Web pages to one another and provide answers to questions from the teacher via the chat dialogue frame 168 of the student interface 176. With the chat feature, students may break into subgroups for collaborative learning. Whenever a student in the group sends a message, the message is sent to the Internet server 20 and every other student in the subgroup receives and views the message in their Chat dialogue frame 168.

The instructor, however, may retain control over the chat feature. For example, the instructor can terminate the chat feature or web pushing to terminate unruly on-line conversations or the sending of Web pages by students.

Unlike conventional distance learning systems, systems consistent with the present invention are more powerful by allowing the instructor to freely and conveniently exercise almost any type of testing strategy. The instructor can test students using a combination of the Chat dialogue feature and Web pages. For example, multiple choice questions and short answer questions can appear in the Chat window 168. Essay questions, requiring longer answers, become Web pages. As mentioned above, students can perform virtual experiments on-line. Once the instructor's personal computer receives student answers, student scoring can be presented to the instructor in any format including tables, charts, diagrams, bar graphs, etc. The instructor, thus, can analyze the results and has the capability of providing real-time feedback to the students.

Students can also receive individualized feedback via branched interactive audio, video and/or graphics responses. For example, the workstation may branch to a particular audio response, preferably prerecorded in the instructor's own voice, based on the student response to a multiple choice question. In this embodiment, a plurality of potential audio responses are made available at the student's workstation according to any one of the methodologies set forth in U.S. Pat. No. 5,537,141, entitled DISTANCE LEARNING SYSTEM, herein incorporated by reference. Alternatively, personalized video, audio and graphics segments can be delivered and displayed to the student based on a student answer or personal profile in the manner set forth in U.S. Pat. No. 5,724,091, entitled COMPRESSED DIGITAL DATA INTERACTIVE PROGRAM SYSTEM, herein incorporated by reference.

Responses to student answers can be more substantive based on the memory feature of the system. The memory feature is an algorithm that selects an interactive response to the user based not only on the student's current answer selection, but also his or her previous responses, as discussed in the aforementioned applications. The algorithm, preferably stored in memory at each student's workstation and under processor control, merely selects an output interactive response based on student responses. As another example, if a student gets three answers in sequence right, he or she receives a more difficult question. If, however, the student misses one or more of the three questions, he or she receives an easier question.

Figure 9:
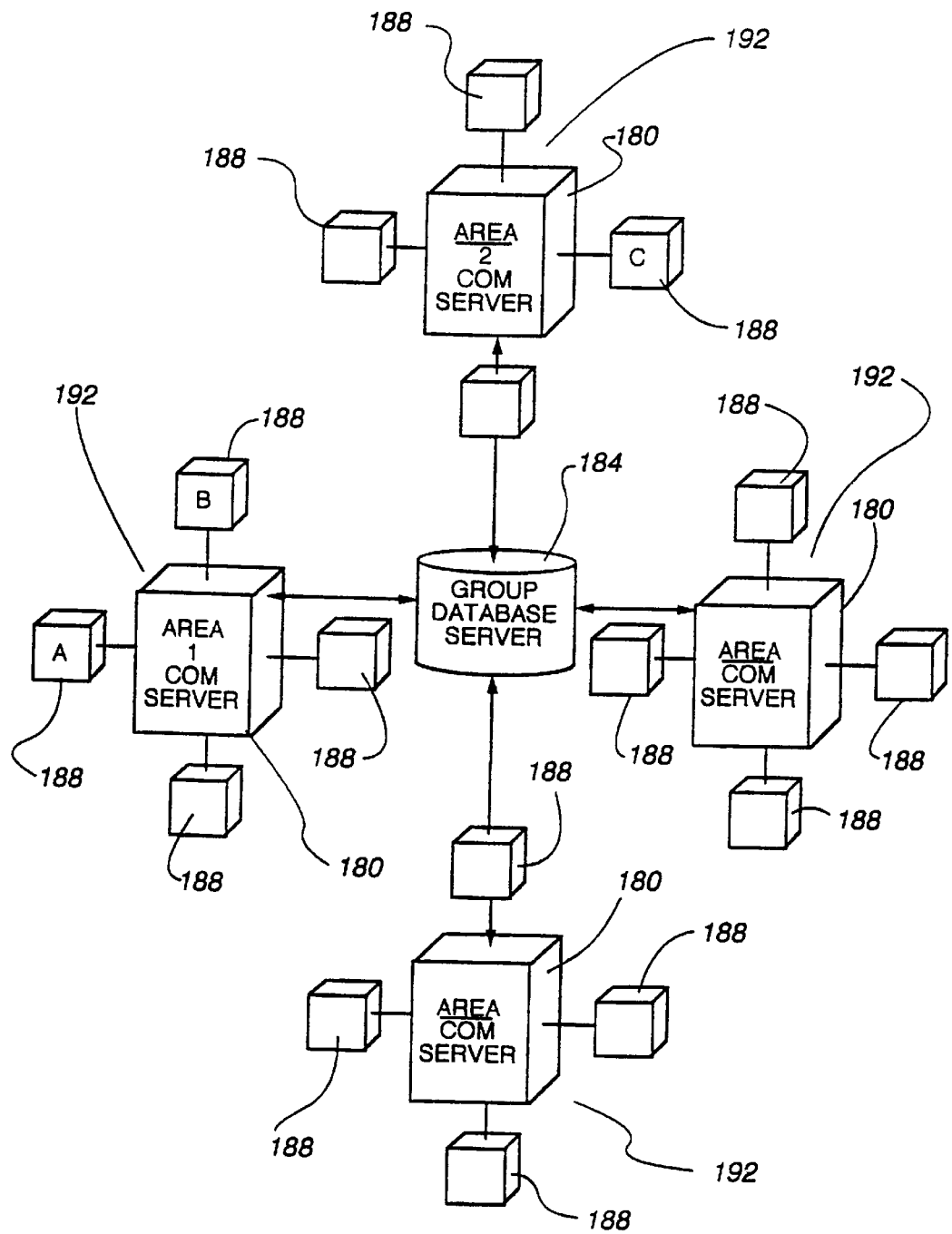
FIG. 9 is a diagram of the distributed Com Server embodiment.

In another embodiment of the present invention, a system is described capable of handling the education requirements of several schools in an efficiently designed network. The system shown in FIG. 9 solves the problems inherent in attempting to service large numbers of users, the most obvious obstacles being the issues of load and performance. In this embodiment shown in FIG. 9, communications servers 180 distribute and route messages across a LAN, WAN and the Internet. Referring to FIG. 9, in the center of the diagram is the Group Database server. Surrounding the database server are several Com Servers 180, each serving an area 192. Surrounding each Com Server 180 are squares representing user stations 188. The Communication Servers 180 are organized in node relationships with one another.

Each node is responsible for serving an Area 192. An Area 192 is defined as a Virtual location serviced by a single Communications Server 180 (or "Com Server"). An Area 192 may be a single school, an office, or may consist of several actual physical locations. The defining characteristic of an Area 192 is that messages sent from one member of an Area 192 to another need not be routed outside of the servicing Com Server 180.

An Area member is analogous to the frequently used term "user." For example, a "user" may be a student in the educational embodiment described above with reference to FIGS. 7 and 8.

The Distributed Communication System of FIG. 9 shall permit the dynamic addition of Communication Servers 180 within a group with little or no administrative tasks as well as the addition of groups within an overall communications network. A Communication Server group consists of several defined Virtual Areas 192 (preferably, consisting of no more the 250 members each), each area 192 serviced by a single Corn Server 180. This system shall allow members of one Area 192, or group to easily communicate with members of another Area 192 or group without any configuration changes.

Generally, service of very large numbers of users has required large expensive servers and networks. As the user base increases, performance suffers and hardware must be upgraded to service the demand.

The Distributed Communication System of the present invention allows the same, relatively inexpensive machines to serve an ever-increasing user base. The technique by which this will be accomplished will be through the routing of messages from one server to another when necessary.

The method essentially follows the same core pattern as IP routing and DNS lookups. If a message is for a member not belonging to the current Area 192 or group, the message shall be routed through the Distributed Communication System until its destination, or someone who knows the destination and can deliver the message, is found.

The destination will be cached so subsequent messages for that member or group may be more efficiently delivered.

Referring again to FIG. 9, if a message is posted by member "A" and is intended only for the members of group 1 the message shall never leave Area 1 Com Server. However, if the message is intended for members of Area 1 and the members of Area 2, the Area 1 Com server forwards the message to the group database server 184. The message shall be broadcast to the members of Area 1 and tagged in the database 184 as belonging to Area 2. The message is then routed to Area 2 and broadcast to Area 2 members. With this technique any member can potentially send a message to any other member. If the Area Com server 180 does not recognize the destination, the message is forwarded up the line.

Each Com server 180 does not need to know about any other server 180. Messages are routed until they delivered. If undeliverable, the original sender is notified.

New Areas 192 can be added on the fly. When a new Com server 188 is added to the network, it registers itself with the database application. Henceforth, any message destined for the new Area 192 can be routed properly without altering the other Area Servers 180.

This method and system works for global messages or for user to user messages. Furthermore, new Groups may also be dynamically added. Once added, each new Group Database Server 184 registers itself with the existing database servers 184. This distribution of load permits nearly unlimited expansion with existing software and hardware. Each server manages a finite number of members, cumulatively serving a growing community.

Users need not be informed as to the particular Com Server 180 they should connect to. Members are directed to a single URL. The selection of the server for user connection is determined by load balancing software. In this manner, the network may appear to be a global network of Servers or simply a local classroom.

The unique aspects of this architecture, using database servers as routing gateways, using techniques resembling IP routing and DNS lookup, enables this system to serve with minimum administration and configuration and with lower end, cost-effective hardware.

Distributed Community Network

A distributed community network provides services, including those discussed above, to an arbitrarily large community of end users by distributing the load among many machines, each providing specific parts of the community. All server functions could reside on one machine in a modest context, whereas in a network of potentially millions, the web of distribution could involve additional server-side hardware or even actual client machines. An implementation of the distributed community network permits routing of content to be spread among multiple machines, which eases the processing burden on the server and provides for dynamic reconfiguration of the network. The dynamic reconfiguration thus may involve adding or removing machines to or from the network due to, for example, new network users or machine failures. As users and machines are added to the network, for example, those machines may include software packet switching.

Examples of services maintained by the distributed community network include a chat service, whiteboard service, and content push/pull service. A chat service involves the ability of a particular group of users to interact, such as via chat frame 168 shown in FIG. 8. The interaction of a particular group of users is referred to as a room, and the distributed community network may dynamically change room assignments to add or delete users from a room. Users may be assigned to a particular room based upon their user profile. A whiteboard service involves the ability of users to receive frames of video information for network collaboration among the users. The whiteboard includes a frame of video information transmitted to users within the same network chat room. The users, depending upon their drawing privileges, may make modifications to the frame, and those modifications are transmitted to the other users. In this manner, the users may collaboratively draw upon the frame.

A content push/pull service involves the ability of users to receive content either directly or through the use of received URLs or other network address information such as Uniform Resource Identifiers (URIs). A URI is a compact string of characters for identifying an abstract or physical resource. More specifically, URIs provide a simple and extensible means for identifying a resource, and a URI can be further classified as a locator, a name, or both. The specification of URI syntax and semantics is derived from concepts introduced by the World Wide Web global information initiative.

URIs include, for example, URLs and Uniform Resource Names (URNs). A URL is a subset of a URI that identifies resources via a representation of their primary access mechanism, such as their network "location," rather than identifying the resource by name or other attribute of that resource. The term URN refers to a subset of URI that is required to remain globally unique and persistent even when the resource ceases to exist or becomes unavailable.

The term "push" refers to the configuration shown in FIGS. 1–6 for automatic delivery of content to the user. The term "pull" refers to delivery of content requiring user interaction. A content push/pull service thus permits users to request content by, for example, selecting or "clicking on" an icon or URL in order to have content transmitted to their machine. In effect, the user "pulls" content to the user machine by requesting the content. The distributed community network may provide for other network-type services as well.

Control over these individual services resides centrally on a server providing the services. However, packet distribution for that service could be distributed over many server or client machines implementing logical entities referred to as hubs. A hub is implemented in software, for example, and it performs routing of packets. The hubs need not implement the specific services for which they distribute packets; rather, they typically need only know the routing protocol for the service. Similarly, centrally controlled routers maintain routing logic for implementing network services. For example, they dynamically update algorithms for optimizing room assignments for a chat service without disturbing routing implemented by the hubs.

In addition, rooms assignments for a chat service are organized hierarchically to facilitate distribution to a targeted audience. The chat service may be controlled by the client as in the case of simple chat service. It also may be controlled by a database and content push/pull service making use of custom knowledge about a client via a profile for use in advertising purposes. In particular, the service may select advertisements to push to a particular client or user based upon the user's profile. Clients may also belong to multiple rooms in a chat service, making it simpler for a push/pull service to create distribution channels for similar clients by subscribing them to the new rooms. The push/pull service may then send the same or similar content to all members of the new room.

Figure 10A:
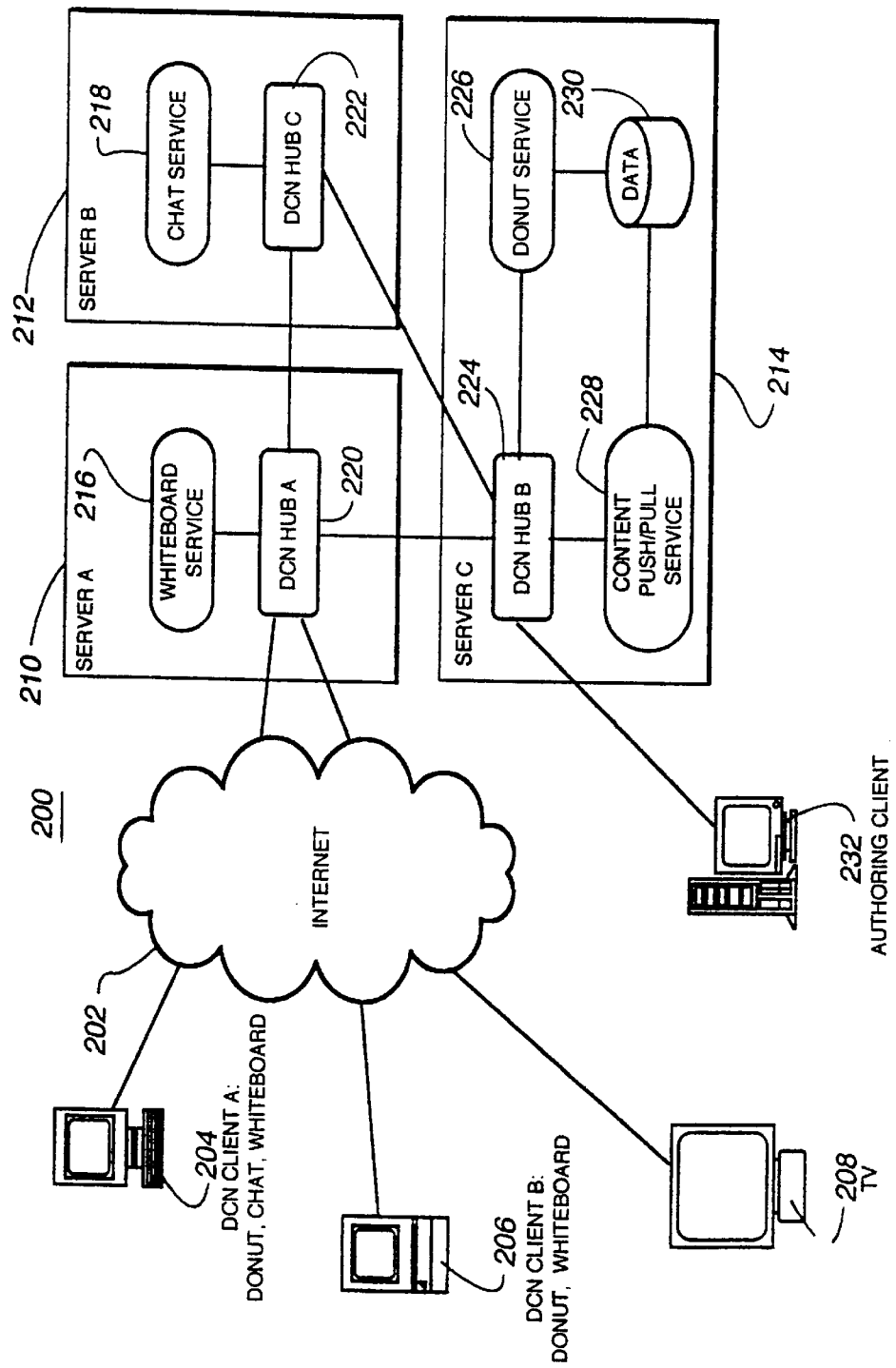
FIG. 10A is a diagram of an exemplary physical network configuration for a distributed community network.

FIG. 10A is a diagram of an exemplary physical network configuration for implementing a distributed community network 200. The configuration includes client machines 204, 206, 208 connected through a network 202 to a hub 220 within a server 210. Network 202 may represent, for example, the Internet, a wide-area network, a local area network, or an intranet. Network 202 may also comprise a cable TV distribution medium, broadcast medium, satellite broadcast, telephone lines, fiber optics, or any other conventional transmission medium. Each of the client machines includes access to particular services managed by corresponding servers. Client machine 204 provides donut, chat, and whiteboard services to a client or user at that machine, for example. Client machine 206 provides donut and whiteboard services. Client machine 208 is a conventional television. A client machine may also comprise a digital TV, a TV with a digital or analog cable box, or a computer connected with a TV.

A donut service refers to the ability to provide content to users based upon user-profile information. The donut services specifies a "donut" of dynamic, hierarchical, shared user-profile information. In particular, it maintains either user profiles or database keys into a data repository containing the profiles. The donut may be stored in a file-type structure on a computer-readable medium such as a memory and accessed by browser programs, associated web server programs, and other applications for use in routing content to the user associated with the donut.

Distributed community network 200 in this example includes three servers 210, 212, and 214. Server 210 includes hub 220 and a whiteboard service 216. Server 212 includes a hub 222 and a chat service 218. Server 214 includes a hub 224 connected to two exemplary services, a donut service 226 and a content push/pull service 228. Both services 226 and 228 are connected with a data repository 230. Examples of information for storage in data repository 230 include user profiles, content for transmission to users, and web pages.

Each of the three servers 210, 212, 214 are interconnected via their respective hubs 220, 222, and 224. In addition, this embodiment includes an authoring client machine 232 connected with hub 224 in server 214. The exemplary services 216, 218, 226, and 228 are only examples of services provided by servers. Many more services could also be provided by the server.

For the services, the servers may provide many types of content such as, for example, video, audio, and multimedia. Web browsers for communicating with the server may be located in various places such as, for example, on a user machine, in a cable head end, in a satellite operations center, or in a set-top box. The web browsers may obtain the content in realtime, or it may be prefetched and cached either locally or on the server. In addition to web browsers, other entities may obtain content.

A distributed community network permits processing for these exemplary services to be distributed among multiple machines, such as servers 210, 212, and 214. The routing for providing the services to client machines 204, 206, and 208 are distributed among the multiple hubs of the servers. Therefore, in order to transmit content to the client machines, the hubs in the servers provide route content from an authoring client machine 232 through network 202 to client machines 204, 206, and 208.

Use of a distributed community network distributes processing among multiple machines in order to ease the burden of providing routing to multiple client machines. It also provides a dynamic reconfigurable network by shifting routing among multiple hubs so that additional client machines may be dynamically added to the network. Each of the client machines 204, 206, and 232 may be implemented with a conventional computer with communication capability for interacting through a network. Each of the servers 210, 212, and 214 may be implemented with a typical server machine.

Figure 10B:
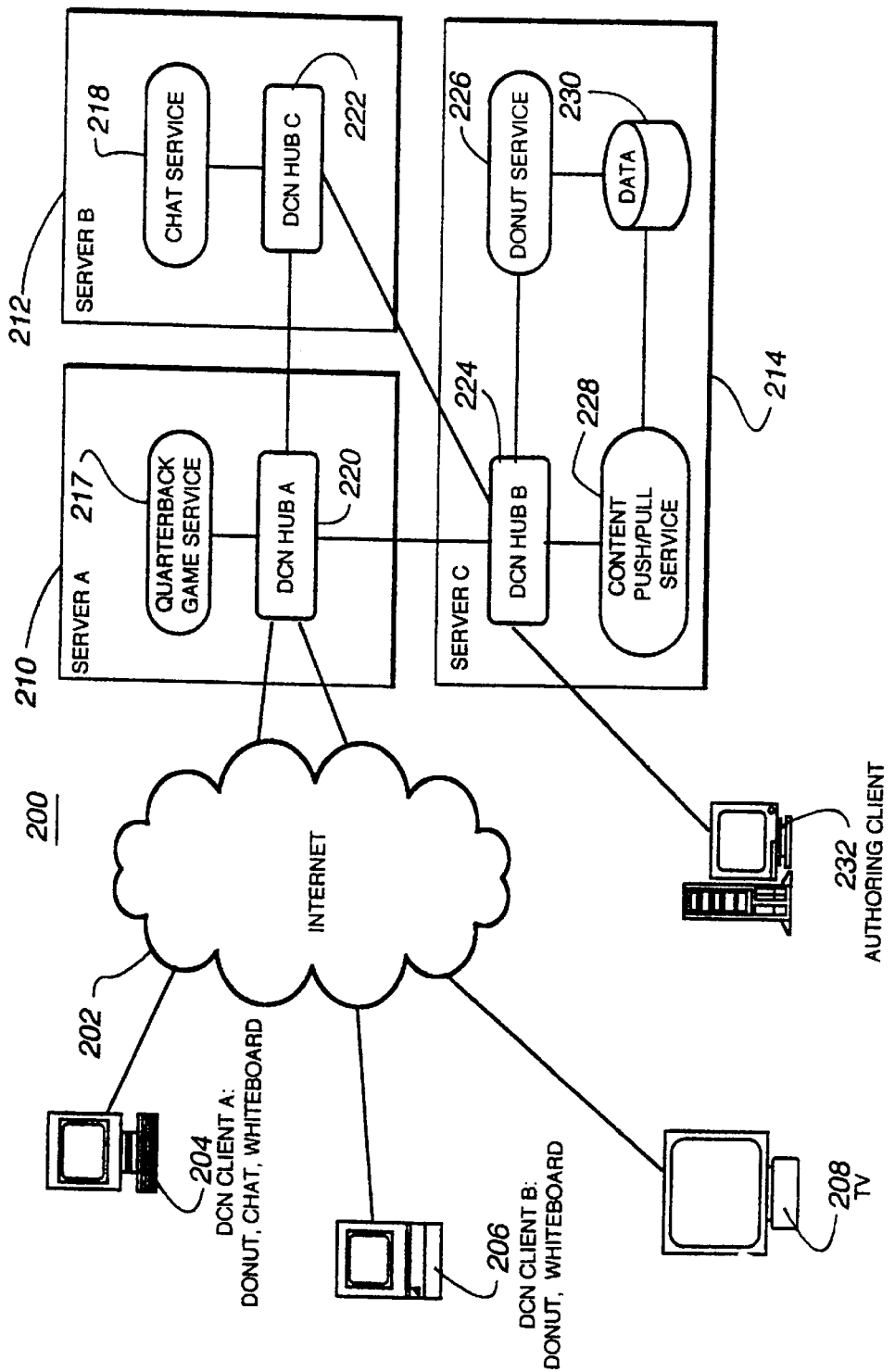
FIG. 10B is a diagram of an exemplary physical network configuration for a particular application of a distributed community network.

FIG. 10B provides an example of use of the network in FIG. 10A for a particular application. For instance, during a Jets v. Giants professional football game, a user, Bob, first switches his cable set-top box to the appropriate video channel for the game. The video originates at a television operations center, is transmitted via satellite to a cable head end, then through a cable plant to Bob's set-top box. Bob also connects to the Internet 202 on his computer and accesses the matching HyperTV web page, involving a particular network service. This web page is located on a server in the point of presence for the service. The point of presence configures Bob's machine 204 into distributed community network 200. Machine 204 opens a persistent socket on configured hub A (220) and sends a subscribe message to configured chat service 218 via hub C (222). In response to the subscribe message, chat service 218 sends an announcement packet to all the members of the configured room via hub A (220) and the Internet 202. In addition, chat service 218 subscribes Bob to the appropriate push/pull service 228 via hubs C (222) and B (224).

Push/pull service 228 extracts Bob's user profile donut from database 230 and pushes the values of the profile down through hub B (224) and hub A (220) through the Internet 202 to Bob's machine 204. Since Bob's donut shows that he has previously indicated that he is a Giants fan, Bob is subscribed to a particular push room for Giant fans by push/pull service 228. As the game progresses, any pushed content for Giants fans and any chat messages from Bob's friends in the chat room are transmitted to him at machine 204 as well.

During the game, a content producer uses the authoring client 232 to send a web page detailing the biography of the Giants quarterback and supporting links to hub B (224). The pushed information is routed to push/pull service 228, which sends a message to Bob and all the other members of that push room by routing it first to hub B (224). Hub B (224) in turn routes it to hub A (220), which distributes it via Internet 202 to Bob's machine 204 and all his friends in the chat room. Hub B (224) might also have routed the message to other hubs that support other people in the same chat room.

Bob reviews the page on the Giants and decides he wants to play a prediction game about the quarterback's decisions from one of the displayed supporting links. Bob "clicks on" the link to select it and generate a pull request, which is transmitted through the persistent socket connection through the Internet 202. The request is routed via hub B (224) to push/pull service 228, which pulls the distributed object (a JAVA game) from database 230 and returns it via the same channel to Bob's machine 204.

As the game progresses, Bob makes predictions about the quarterback's behavior. After each play, data updating the game arrives from authoring client 232 into hub B (224), and is then routed to QB game service 217 via hub A (220) and hub B (224). The game service processes the authoring client's data and sends the resultant data to Bob via hub A (220) and the Internet 202. The data is presented by the distributed object JAVA game on Bob's client machine 204.

The quarterback fumbles. The producer at authoring client 232 pushes a dynamic HyperText Markup Language (DHTML) instruction in Javascript through hub B (224) and hub A (220) through the Internet 202 to Bob's machine 204. At Bob's machine, the DHTML is executed and Bob receives on his computer screen an animated image of the word Fumble!

Figure 11A:
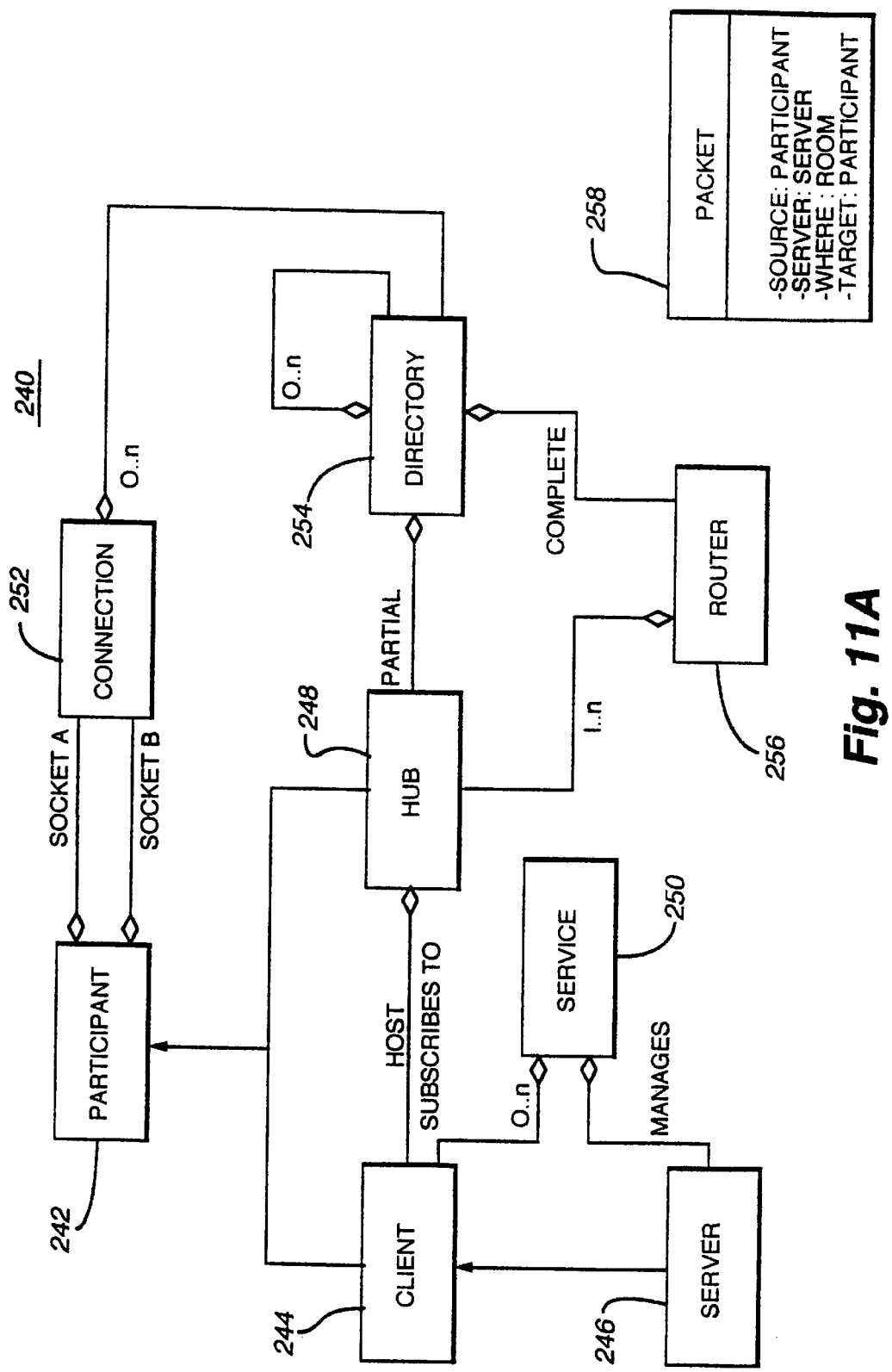
FIG. 11A is a diagram of an exemplary logical structure for a distributed community network.

FIG. 11A is a diagram of an exemplary logic structure 240 for distributed community network 200 shown in FIG. 10A. Logic structure 240 illustrates logical relationships among entities within physical distributed community network 200. In particular, an arrow represents a class/subclass relationship, and a diamond represents a relationship identifying an attribute of an entity. A client 244 may correspond with one of the client machines 204, 206, and 208 and it subscribes to a hub 248, which may correspond with hub 220, 222, or 224 within one of the servers 210, 212, and 214. A server 246 may correspond with one of the servers 210, 212, and 214, and it manages a service 250, which may correspond with one of the services 216, 218, 226, or 228.

Client 244 is a type of participant 242, which is a client machine subscribed to a particular service such as service 250. The client's status as participant 242 identifies it as a member of a particular room for a chat service. A directory 254 through a connection 252 provides communication for locating users for participant 242. In particular, connection 252 is a network connection between two participants over which packets can be sent, and directory 254 provides instructions for identifying which participants are to receive particular content, where they are located on the network, and which content they are to receive.

Router 256 maintains map of a portion of the distributed community network for resolving routing questions from hubs, adding new participants to the network, and adding participants to services, which involves adding connections. In particular, hubs request routing decisions from router 256, and in response router 256 provides instructions to the hubs for their use in routing packets. For example, if hub A (220) failed, router 256 can issue instructions to the remaining hubs to avoid routing packets through hub A (220).

Directory 254 includes information used in routing information among client machines, and it provides information to hub 248 for use in routing information. The term directory is used to refer to a room for a chat service or any other service. Directory 254 is a hierarchical collection of a directory, terminated with a room and it has a subdir (set of directories). A room is a directory and identifies a group of clients subscribed to a service, such as a chat service. A room has clients (set of participants) and hubs (set of hubs) where hubs is a subset of clients.

Packet 258 is a structured piece of information delivered from one client to another. It may include any type of content for various services such as a push/pull service or a chat service. For example, in the chat service client 244 creates a packet when the user enters information and sends it to a hub associated with the client's machine. The hub sends that packet to all the connections subscribed to that room. If the connections include another hub, the process iterates, thus distributing the packet to the room over multiple hubs. Packet 258 identifies hierarchical routing information including a source (participant), dir (directory), target (participant), conn (connection), and a route (set of participants).

The packet with the routing information may include a variety of types of information as its payload or transmitted content. The packet may include data to be displayed, for example, to a user in a particular frame on a display device. The packet may also include one or more distributed executable objects, and the objects may include data, executable code, or data in combination with executable code. The executable code may include, for example, a JAVA applet or any type of entity specifying executable code.

Hub 248 includes software for routing packets, and it may be used to push an application or content to multiple users. Examples of such applications or content include a whiteboard, a JAVA game, chat messages, text, and a file. By distributing hubs among multiple machines, the burden on a server of routing packets is decreased. Also, hub 248 includes a connection to a router 256 for obtaining routing information, if necessary. Table 1 includes an example of hub logic for use by hub 248 in routing packet 258; this logic may be implemented in software or firmware modules for execution by a corresponding machine.

TABLE 1

Hub Logic

```
on receive Packet p
    // find my Directory dir
    if ! p.dir in my dirs
        my dirs[p.dir]= my routers.get(p.dir)
    d = my dirs[p.dir]
    // handle targeted and broadcast separately
    if p.target is empty
        // send it to all the clients in the room
        for i in d.clients (recursive)
            if i.conn !=p.conn
                send p to i.conn
```

TABLE 1-continued

Hub Logic

```
        else
            // se if I have a direct connection to the target
            for i in d.clients (recursive)
                if i.id == p.target
                    send p to i.conn
                    done // it's delivered
            // we don't have the client, so send it to
            // all the relevant hubs
            for i in d.bubs (recursive)
                // if it has routing info, route
                if i.id in p.route
                    send p to i.conn
                    done // it's en-route
                // otherwise, send it to all my sub-hubs
                else if p.route is empty
                    send p to i.conn
                    // we have to keep going, since it
                    // may not p.target may not be in
            // if we got this far, we failed to deliver
            send <not found> to p.source via p.connection
```

Figure 11B:
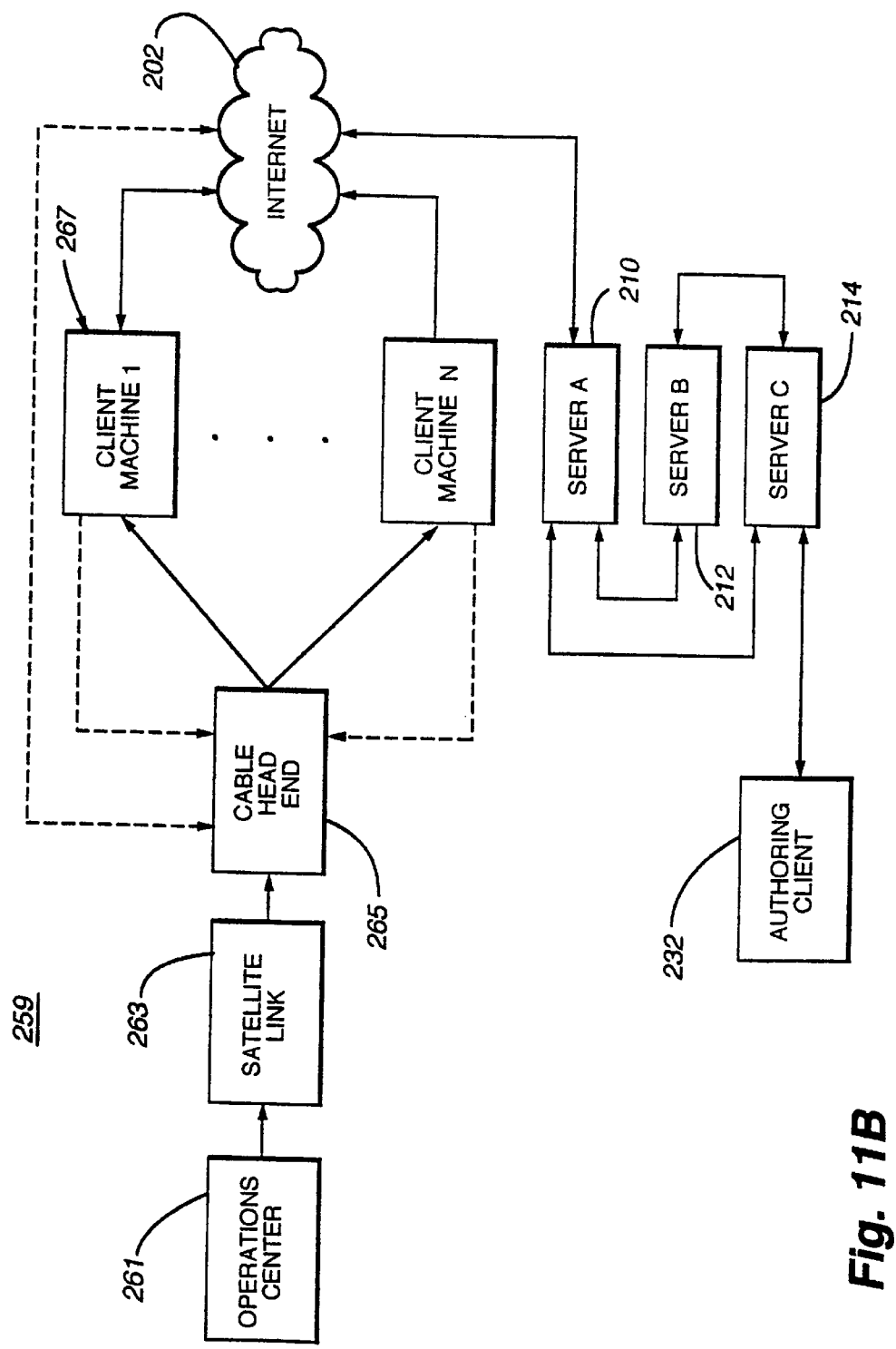
FIG. 11B is an exemplary diagram of a physical network configuration for a distributed community network illustrating an alternative source for a video signal.

FIG. 11B is an exemplary diagram of a physical network configuration 259 for a distributed community network illustrating an alternative source for a video signal. Configuration 259 illustrates conventional distribution of video or television content using cable television signals. An operations center 261 generates a cable television signal having content for distribution and transmits the cable television signal over a satellite link 263 to one or more cable head ends 265. Cable head end 265 can include a web browser for interacting with a network such as the Internet 202. Cable head end 265 receives the cable television signal from satellite link 263 and distributes the signal over cable lines to client machines 267. Alternatively, the operations center can transmit over a satellite link to the client machines, foregoing the cable route. Client machines 267 may represent conventional televisions or any machine capable of displaying cable television signals (such as a personal computer with a TV card or module for processing TV signals for display). Client machines 267 may also include connection to a network such as the Internet 202 for implementing a distributed community network.

Figure 12A:
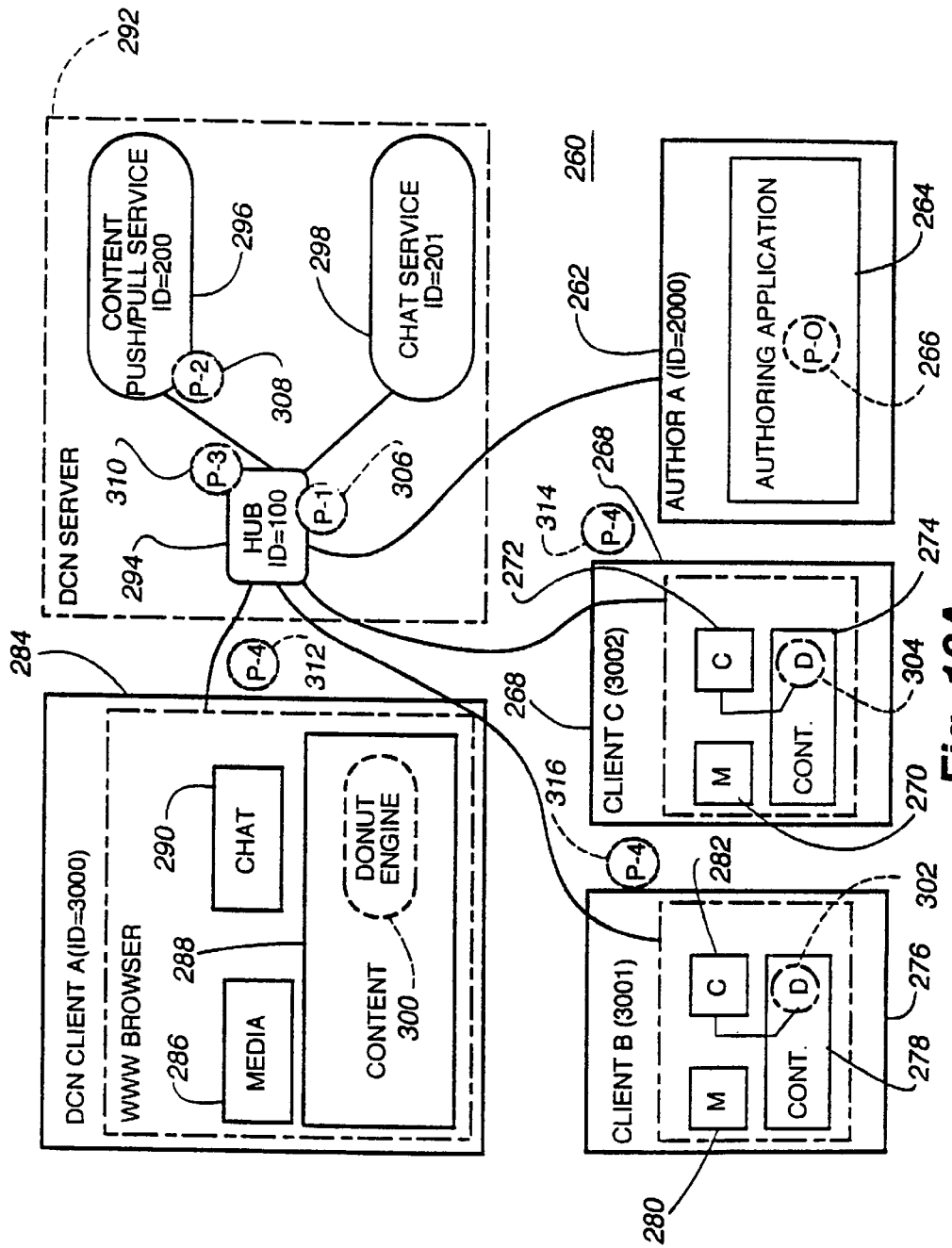
FIG. 12A is a diagram of an exemplary content push packet flow in a distributed community network.

FIG. 12A is a diagram of an exemplary content push packet flow 260 in distributed community network 200 for implementing a content push/pull service. The content push packet flow involves transmission of content via packets through the logic structure 240 shown in FIG. 11A as implemented in the physical distributed community network configuration 200 shown in FIGS. 10A and 10B. As described above, a system may provide to a user both video and other media content, such as any content available via a URI or a client-side script such as a JAVA script. The type of media content pushed to a user may depend upon the user's profile.

The media content may include, for example, video, audio, combined video and audio, or multimedia content. When transmitting different types of media content, such as both video and audio, the media content may be transmitted from the same or different sources. In addition, the content may be transmitted from a wide variety of sources such as, for example, television, broadcast television, cable, satellite, local video, and local CD-ROM or digital versatile disk (DVD). The local content may be stored on the hard disk drive of a user's machine.

As shown in FIG. 12A, a content push/pull packet flow 260 includes interaction of multiple machines transmitting the packets. The packets may originate from various sources such as a web browser on a client machine, a cable head end, or a server. Client machines 284, 276, and 268 may correspond with client machines shown in FIG. 10A and client logic elements shown in FIG. 11A. Client 284 includes a browser program which provides frames for the following services: media 286, chat 290, and content 288. Client 276 likewise includes a browser program providing frames for media 280, chat 282, and content 278 services. Client 268 includes frames for media 270, chat 272, and content 274 services. Clients 284, 276, and 268, as shown, typically have the same services or access to the same services; alternatively, they may each implement different services. Also, they may implement different network services than those shown, such as a whiteboard service as identified above.

As shown in FIG. 8, chat service may include an associated chat frame 168 on a user's machine; content may include web pages 176; and media frames may include transmitted video programs. Also, as explained in the embodiments provided above, the implementation of a chat service may use a digital television, digital cable box, or personal computer. In addition, the program from the program sources, such as those identified above, and the content from a network service, such as a chat service or a push/pull service, may be provided on the same or different physical machines. For example, both the program and the content may be provided on a television or on a personal computer, or they may be provided on separate physical machines such as providing the program on a television and providing the content for the network service on an associated personal computer.

As shown in FIG. 12A for the push/pull service flow, authoring client 262 includes an authoring application 264 for creating a packet 266. An authoring application includes any program for use in creating a packet containing or identifying particular content. A server 292 provides for routing of packet 266. In particular, it includes a hub 294 coupled to a content push/pull service 296 and a chat service 298. The routing of packets and their content for the exemplary content push/pull service is further explained in Table 2 illustrating packet structure throughout the flow.

Authoring client 262, using authoring application 264, creates packet P-0 (step 266) and transmits it to server 292 where it is received by hub 294 as packet P-1 (step 306). Hub 294 routes the packet to an individual target. In particular, content push/pull service 296 sends packet P-2 to an entire directory via hub 294 (step 308). Hub 294 routes packet P-3 to all members of the directory (step 306), and each client receives the packet P4 (steps 312, 314, 316). Hub 294 may include software for routing packets, as illustrated by the logic in Table 1. The packets identify information in the header used by the hub logic in routing the packets for the push/pull service.

Figure 12B:
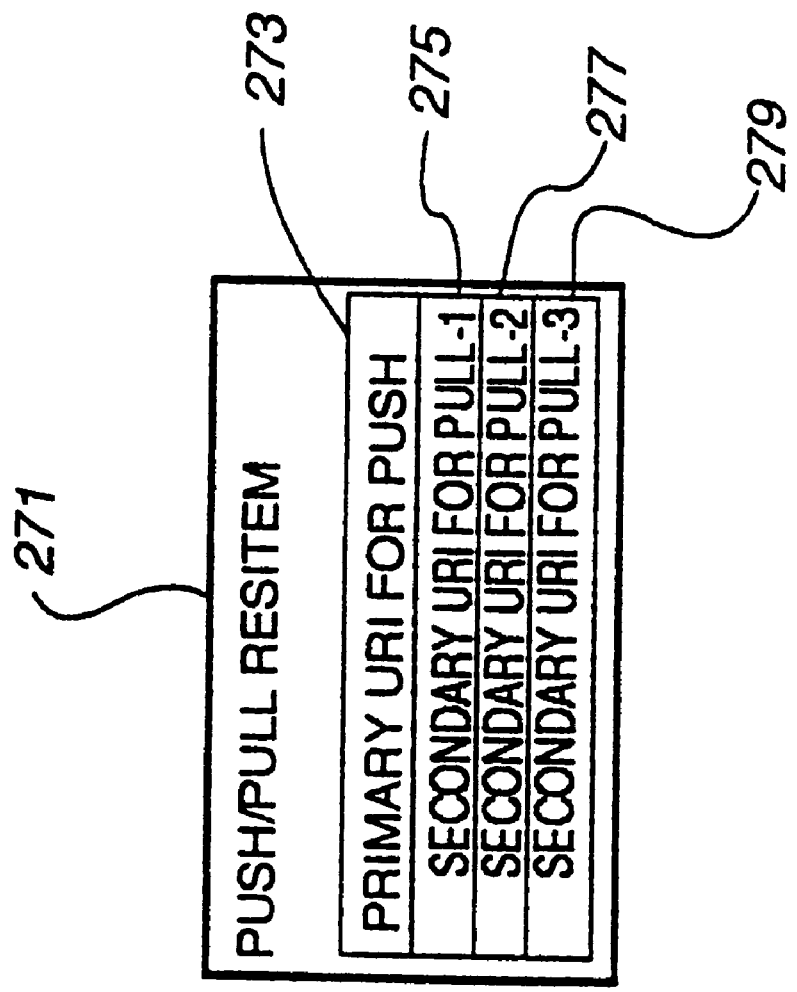
FIG. 12B is a diagram of an exemplary push/pull packet content for use in a distributed community network.

FIG. 12B is a diagram of an exemplary push/pull packet content 271 for use in distributed community network 260 as packet P-4. Packet 271 includes a primary URI 273 for use by client machines 262, 268, 276, and 284 in retrieving content to be pushed to the machines. Packet 271 also may include one or more URIs for use by the client machines in pulling content. For example, packet 271 includes a URI 275 for a first pull item, a URI 277 for a second pull item, and a URI 279 for a third pull item. The pull items may include an element to be displayed to the user, such as an icon, such that when the user "clicks on" or selects the item, the corresponding client machine uses the URI associated with the displayed item to retrieve content and display the content to the user. Packet 271 may include multiple URIs for pushed content, as well as the multiple URIs for pulled content.

TABLE 2

|        | P-0                                                                                                   | P-1                                                              | P-2                                                             | P-3                                                           | P-4                                                                                                                           |
|--------|-------------------------------------------------------------------------------------------------------|------------------------------------------------------------------|-----------------------------------------------------------------|---------------------------------------------------------------|-------------------------------------------------------------------------------------------------------------------------------|
| source | 2000                                                                                                  | 2000                                                             | 2000                                                            | 2000                                                          | 2000                                                                                                                          |
| service| content push/pull                                                                                     | content push/pull                                                | content push/pull                                               | content push/pull                                             | content push/pull                                                                                                             |
| target | 200                                                                                                   | 200                                                              | —                                                               | —                                                             | —                                                                                                                             |
| dir    | 5                                                                                                     | 5                                                                | 5                                                               | 5                                                             | 5                                                                                                                             |
| action | PUSH                                                                                                  | PUSH                                                             | PUSH                                                            | PUSH                                                          | PUSH                                                                                                                          |
| note   | author 262 creates packet P-0 containing a URI to be displayed and URIs to pull information           | hub 294 routes packet P-1 to individual target, service 296      | service 296 sends packet P-2 to entire directory via hub 294    | hub 294 routes packet P-3 to all members of the directory     | each client 268, 276, 284 in the directory receives packet P-4, including the URI to be displayed and the URIs to pull information |

Figure 13:
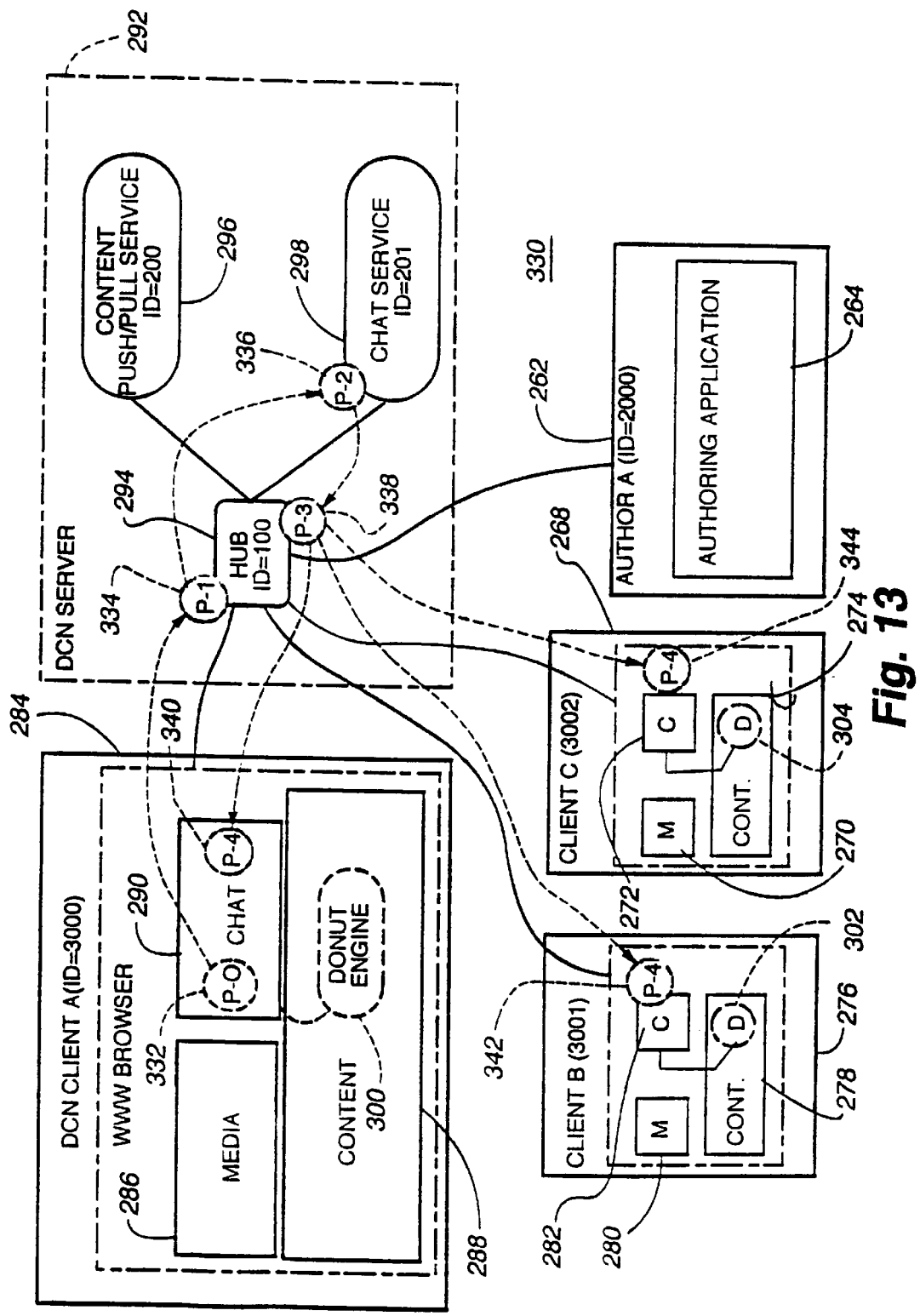
FIG. 13 is a diagram of an exemplary chat packet flow in a distributed community network.

FIG. 13 is a diagram of exemplary chat packet flow 330 in distributed community network 200. This diagram includes the same logic elements as shown in FIG. 12A with routing for flow of a chat packet using chat service 298 and implementations include the various alternatives identified above with respect to FIG. 12A.

The routing of packets and their content for the exemplary chat service is further explained in Table 3 illustrating packet structure throughout the flow. In this example, client 284 creates a new chat message as packet P-0 (step 332). The client may use an application associated with the chat service to enter information, such as typing in a text string using an keyboard, and send it in packet form. The application may include, for example, scripts associated with the chat frame on the user machine.

Packet P-0 from client machine 284 is directed to the server 292 where it is received as packet P-1 (step 334). Hub 294 routes the packet to an individual target as identified in the header information of the packet. In particular, chat service 298, using hub 294, sends packet P-2 to the entire directory (step 336). Hub 294 routes packet P-3 to all members of the directory (step 338), in which case is received by each of the client machines in the directory as packet P-4 (steps 340, 342, 344). Hub 294 may include software for routing packets, as illustrated by the logic in Table 1.

Programs in each client machine 268, 276, 284 associated with the chat service, such as scripts associated with the chat frames in the client machine, receive packet P-4 and perform necessary processing to extract the content originally created by the user at machine 284 (packet P-0) and display that content in the chat frames 272, 282, 290.

Figure 14A:
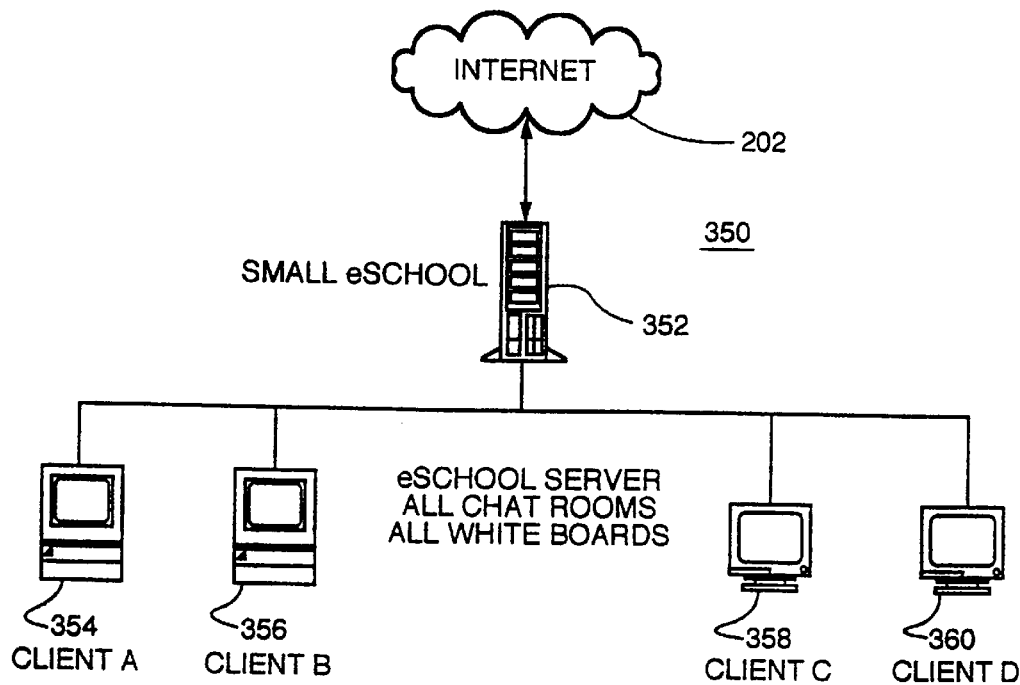
FIG. 14A is a diagram of an exemplary implementation of a distributed community network as a small eSchool.

FIGS. 14A–14D are examples of implementations for distributed community network 200. FIGS. 14A is a diagram of a distributed community network 350 for a small eSchool. Network 350 includes in this example a server 352 providing service for all chat rooms and whiteboards and is coupled to client machines 354, 356, 358, and 360. Each client machine thus may access chat room and whiteboard services as managed by the server. Server 352 may include a hub having software for routing information, as illustrated by the logic in Table 1. Server 352 may also include a connection with a network such as the Internet 202.

Figure 14B:
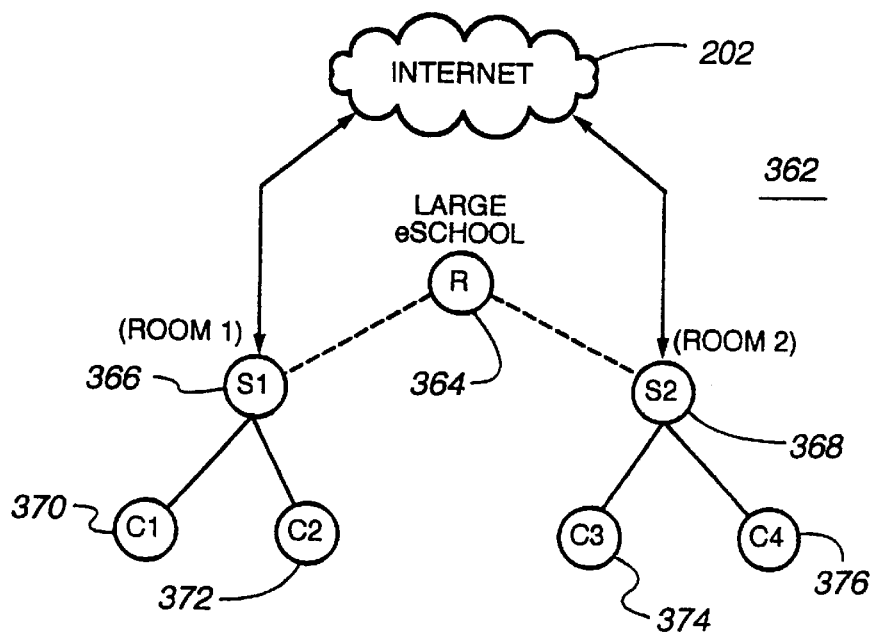
FIG. 14B is a diagram of an exemplary implementation of a distributed community network as a large eSchool.

FIG. 14B is a diagram of an exemplary implementation of a distributed community network 200 as a large eSchool 362. Configuration 362 includes a router 364 connecting servers 366 and 368. Each server manages a separate chat room and may exchange information through router 364. Two clients 370 and 372 are connected with a server 366 for the first chat room. Two additional clients 374 and 376 are connected with server 368 for the second chat room. Servers 366 and 368 may include hubs having software for routing information, as illustrated by the logic in Table 1. Servers 366 and 368 may include a connection with a network such as the Internet 202.

Figure 14C:
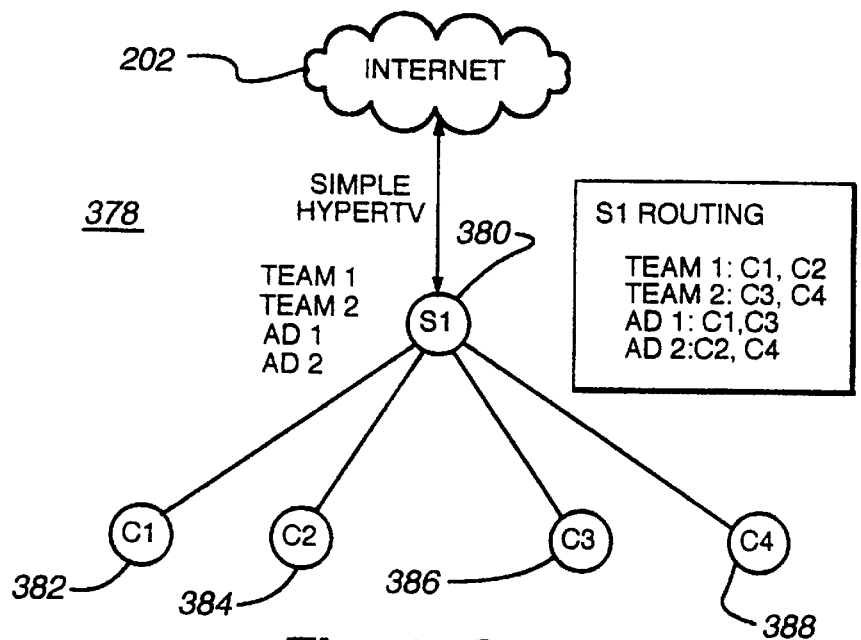
FIG. 14C is a diagram of an exemplary implementation of a distributed community network as a simple network providing video and other content.

FIG. 14C is a diagram of an exemplary implementation of distributed community network 200 as a simple configuration 378 providing video and other content. Configuration 378 includes a server 380 coupled to clients 382, 384, 386, and 388. Server 380 in this example includes two directories identified as teams 1 and 2. One directory includes clients 382 and 384, and the other includes clients 386 and 388. These directories identify rooms for participants of a chat service maintained by server 380. Server 380 also identifies the type of content to be transmitted to the clients in its

TABLE 3

|         | P-0                                                                         | P-1                                                                 | P-2                                                             | P-3                                                           | P-4                                                              |
|---------|-----------------------------------------------------------------------------|---------------------------------------------------------------------|-----------------------------------------------------------------|---------------------------------------------------------------|------------------------------------------------------------------|
| source  | 3000                                                                        | 3000                                                                | 3000                                                            | 3000                                                          | 3000                                                             |
| service | chat                                                                        | chat                                                                | chat                                                            | chat                                                          | chat                                                             |
| target  | 201                                                                         | 201                                                                 | —                                                               | —                                                             | —                                                                |
| dir     | 5                                                                           | 5                                                                   | 5                                                               | 5                                                             | 5                                                                |
| Action  | SAY                                                                         | SAY                                                                 | SAY                                                             | SAY                                                           | SAY                                                              |
| note    | client at machine 284 enters new chat message, packet P-0                   | hub 294 routes packet P-1 to individual target, chat service 298    | chat service 298 sends packet P-2 to entire directory via hub 294 | hub 294 routes packet P-3 to all members of the directory   | each client 268, 276, 284 in the directory receives packet P-4  | directory by being pushed to the clients by a content push/pull service. In this example, a first advertisement is to be transmitted to clients 382 and 386, and a second advertisement is to be transmitted to clients 384 and 388. Therefore, server 380 via a directory structure may specifically identify the type of content to be transmitted to particular clients. Server 380 may include a hub having software for routing information, as illustrated by the logic in Table 1. Server 380 may also include a connection with a network such as the Internet 202.

Figure 14D:
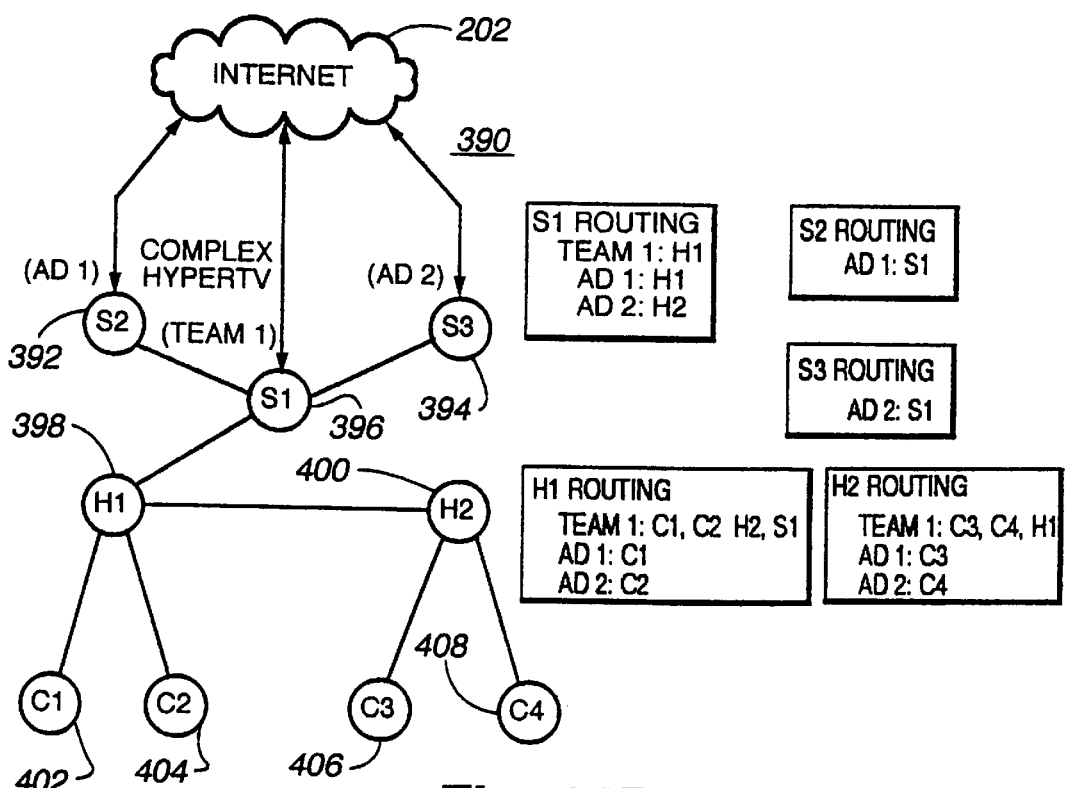
FIG. 14D is a diagram of an exemplary implementation of a distributed community network as a complex network providing video and other content.

FIG. 14D is a diagram of an exemplary implementation of a distributed community network as a complex configuration 390 providing video and other content. Configuration 390 includes a server 392 and a server 394 both connected with a server 396. Server 396 is connected with hubs 398 and 400. Hub 398 is connected with clients 402 and 404, and hub 400 is connected with clients 406 and 408. Servers 392, 394, and 396 may include hubs having software for routing information, as illustrated by the logic in Table 1.

Configuration 390 also includes its own directory structure for the routing of information. Server 396 routes to team 1 or hub 398, and provides separate advertisements for hubs 398 and 400. The teams identify rooms for participants of a chat service, and the advertisements refer to particular content to be pushed to users by a content push/pull service. The directory for server 394 includes a first advertisement to be transmitted to server 396 and a second advertisement to be transmitted to server 396. The directory for hub 398 includes a first team for clients 402 and 404, and hub 400 and server 396. It further includes the first advertisement to be transmitted to client 402, and a second advertisement to be transmitted to client 404. The directory for hub 400 includes a first team for clients 406 and 408 and hub 398. It also includes a first advertisement to be transmitted to client 406, and a second advertisement to be transmitted to client 408. Servers 392, 394, and 396 may also include a connection with a network such as the Internet 202.

Using the foregoing embodiments, methods and processes, the system of the present invention creates a synergistic experience combining the vast resources of the Internet with the presentation capabilities of television. Various embodiments for implementing a distributed community network consistent with the present invention are possible using different types of networks with or without use of the Internet.

APPENDIX A

Copyright Notice: This source code is © Copyright 1996, EarthWeb LLC. All Rights Reserved. Distribution of this document or it's resulting compiled code is granted for non-commercial use, with prior approval of EarthWeb LLC. Distribution of this document or its resulting compiled code, for commerical use, is granted only with prior written approval of EarthWeb, LLC. For information, send email to info@earthweb.com.

nativeInputstream.java

```
/
public class nativeInputStream extends java.io.InputStream {
    public native int read();
    public native void nativeinit();
    public nativeInputStream() {
        super();
        nativeinit();
    }
    static {
        System.loadLibrary("instream");
    }
}
``` ativeInputStreamCode.cppw

```
#include <StubPreamble.h>
#include "nativeInputStream.h"
#include <Windef.h>
#include <Winbase.h>
#include <stdio.h>
HANDLE h;
long nativeInputStream_read(struct HnativeInputStream *) {
        DWORD evttype;
        unsigned long nrcad = 0; // the number of characters read
        unsigned char result; // the character read
        while (nread == 0) ReadFile(h, (LPVOID) &result, 1, &nread, NULL);
        return (long)result;
}
void nativeInputStream_nativeinit(struct HnativeInputStream *) {
h = CreateFile("COM1", GENERIC_READ|GENERIC_WRITE, 0, NULL,
        OPEN_EXISTING, 0, NULL);
        DCB dcb;
        GetCommState(h, &dcb);
        dcb.BaudRate      = 9600;
        dcb.ByteSize      = 8;
        dcb.Parity        = NOPARITY;
        dcb.StopBits      = ONESTOPBIT;
        SetCommState(h, &dcb);
        SetCommMask(h, EV_RXCHAR);
        char *comcode = "\1B";
        unsigned long nwritten - 0;
```

APPENDIX A-continued

```
            while (nwritten<2) WriteFile(h, (LPVOID)comcode, 2, &nwritten, NULL);
            printf("Yeah!");
    }
                                        Serial.cpp include <Wintypes.h>
include <Winbase.h>
#include <Windef.h>
#include <stdio.h>
#include <conio.h>
//#define COM1 = Ox3F8
//#define COM2 = Ox2F8
HANDLE h;
Int main() {
            unsigned char result;
            unsigned long nread;
            h = CreateFile("COM1", GENERIC_READ|GENERIC_WRITE, 0, NULL,
                                    OPEN_EXISTING, 0, NULL);
    if (h == INVALID_HANDLE_VALUE) {
            printf("N00000!");
    }
    DCB dcb;
    GetCommState(h, &dcb);
    dcb.BaudRate           = 9600;
    dcb.ByteSize           = 8;
    dcb.Parity             = NOPARITY;
    dcb:StopBits           = ONESTOPBIT;
    SetCommState(h, &dcb);
    SetCommMask(h, EV_RXCHAR); printf("Reading
            serial port:\n");
            DWORD evttype;
            while (1) {
            printf("%c", nativeInputStream_read() {
/*          WaitCommEvent(h, &evttype, NULL);
            while (ReadFile(h, (LPVOID)&result, 1, &nread, NULL))
                printf("%c", result); */
            }
            return 0;
}
long nativeInputStream_read() {
            DWORD evttype;
            unsigned long nread; // the number of characters read
            unsigned char result; // the character read
            WaitCommEvent(h, &evttype, NULL);
            ReadFile(h, (LPVOID)&result, 1, &nread, NULL);
            return (long)result;
}
                                        Tvcontrol.java import java.applet.*;
import java.awt.*;
import java.io.*;
import java.net.URL;
import java.net.MalformedURLException;
import java.util.Hashtable;
class blackPanel extends Panel {
            public void paint(Graphics g) {
                g.setColor(Color.black);
                g.fillRect(0, 0, size().width, size().height);
            }
}
class displayFrame extends Panel implements Runnable {
            int xoffset = 30;
            int yoffset = 40;
            List URLlist;
//          TextField textl;
            Checkbox autobrowse;
            String textlStr = "";
            int rlx, rly;
            AppletContext apc;
            Thread thread;
            InputStream din;
            Hashtable dict;
            Hashtable visited;
            boolean periodbefore; //
            HACK ALERT
            public displayFrame(String frameName, AppletContext apc, InputStream in) {
//              super(frameName);
                this.apc = apc;
```

APPENDIX A-continued

```
                din = in;
            dict = new Hashtable();
            visited = new Hashtable();
            thread = new Thread(this);
            thread.start();
                resize(106 + xoffset, 156 + yoffset);
                rlx = -(size().width/4);
                rly = size().height/4;
                setLayout( new BorderLayout() );
                add( "South", autobrowse = new Checkbox("Autobrowse"));
                autobrowse.setState(true);
                URLlist = new List ();
                add ("Center", URLlist);
// rl.setConstraint(URLlist, autobroowse, RelativeLayout.under, -4, 10);
// rl.setConstraint(URLlist, button(), RelativeLayout.under, -4, 10);
// URLlist.setBackground( Color.cyan 1);
// Font newfont = new Fort("TimesRoman", Font.PLAIN, 10);
// URLlist.setFont( newfont );
        }
        public synchronized void turnToURL(String s, String target) {
                System.out.println("Turning to URL " + s + target);
                visited.put(s, this);
                try apc.showDocument(new java.net.URL(s), target);
                catch (Exception e);
        }
        public void turnToTitle(String s, String target) {
                System.out.println("Turning to Title " + s + target);
                turnToURL((String)(dict.get(s)), target);
        }
        public synchronized void addURL(String title, String url) {
            String previous = (String)(dict.get(title));
            if (!(dict.containsKey(title))) URLlist.addItem(title);
            dict.put(title, url);
        }
        public void run() {
        Thread.currentThread().setPriority( Thread.MIN_PRIORITY );
//System.out.println("Context: "+apcon);
                char buf[ ] = new char[128];
                int bufidx = 0;
                boolean capture = false;
                String currentTitle = null;
    try {
            // Listener loop
            int c;
            periodbefore = false;
            while ((c = (din.read())) ! = -1) {
            if (c == '.') {
                if (capture && periodbefore) {
                bufidx--;
                c = (byte)'>';
                periodbefore = false;
            }   else periodbefore = true;
            } else periodbefore = false;
            if ((char)c == '>') {
                capture = false;
                String result = new String(buf, 0, bufi dx);
                System.out.println("Remote found tag " + result);
                if (result.startsWith("URL:")) {
                    result = result.substring(4);
                    if (currentTitle != null) addURL(current Title, result);
                    if (autobrowse.getState() && ! (visited.containsKey(result))) {
                        URLlist.select(URLlist.countItems()-1);
                        turnToURL(result, "browser");
                    }
                    currentTitle = null;
                }
                else if (result.startsWith("Title:"))
                    currentTitle = result.substring(6);
            }
                if (capture) {
                        buf[bufidx++] = (char)c;
                        if (bufidx >= buf.length)
                        capture = false;
                }
                if ((char)c == '<') {
                        capture = true;
                        bufidx = 0;
                }
            }
```

APPENDIX A-continued

```
// This is an acceptable exception
} catch( EOFException e ) System.out.println( "URLClient: eof" );
// This is probably not.
catch( IOException e ) System.out.println( "URLClient.run: "+e );
        }
//      public void paint(Graphics g) {
//              g.setColor(Color.black);
//              g.fillRect(0, 0, size().width, size().height);
//      }
        public void -update(Graphics g) {
                repaint();
        }
        public boolean action(Event evt, Object what) {
                URL where;
                turn To Title((String)what, "browser");
                repaint();
                return true;
        }
}
public class TV control extends Applet {
        static displayFrame remoteFrame = null;
        public void init() {
                InputStream in;
                AppletContext apc = getAppletContext();
                in = new nativeInputStream();
                setLayout(new BorderLayout());
                if (remoteFrame == null)
                    remoteFrame = new displayFrame("Remote Control", apc, in);
                    add ("Center",remoteFrame);
                    remoteFrame.show();
        }
        public void start() {
                remoteFrame.apc = getAppletContext();
        }
}
``` index.html

```
<TITLE>WebTV</TITLE>
<FRAMESET ROWS="33,66">
<FRAMESET COLS="35,65">
<FRAME SCROLLING="no" NAME="tv" SRC="file://once-ler/pub/moo.tv">
<FRAME SCROLLING="no" NAME="control" SRC="control.html">
<NOFRAMES>blank.html</NOFRAMES>
</FRAMESET>
<FRAME SCROLLING="yes" NAME="browser" SRC="browser.html"></FRAMESET>
``` control.html

```
<title>Remote</title>
<center>
<applet code="TVcontrol.class" width=300 height=100></applet>
</center>
``` browser.html

```
<title></title>
<body bgcolor="#ffffff">
<center><b>This is the browser window.</b></center>
``` inst.h

```
#ifndef __INST_H__
#define __INST_H__
#include "npapi.h"
class CPluginWindow;
// Instance state information about the plugin. *Developers*: Use this struct to hold
// per-instance information that you'll need in the various functions in this file.
typedef struct_PluginInstance
{
    NPWindow*     fWindow;
    uint16    fMode;
            CPluginWindow* window;
} PluginInstance;
#endif
```

Npshell.cpp

```
//#include "windows.h"
#ifndef __NPAPI_H__
#include "npapi.h"
#endif
#include "inst.h"
#include "plgwnd.h"
```

APPENDIX A-continued

```
#include "wintv.h"
// NPP_Initialize:
NPError NPP_Initialize(void)
{
        PCV_Initialize();
    return NPERR_NO_ERROR;
}
//NPP_Shutdown:
void NPP_Shutdown(void)
{
        WTV_Exit(0):
}
//NPP_New:
NPError NP _LOADDS
NPP_New(NPMIMEType pluginType,
                NPP instance,
                uint16 mode,
                int16 argc,
                char* argn[],
                char* argv[],
                NPSavedData* saved)
{
    if (instance == NULL)
        return NPERR_INVALID_INSTANCE_ERROR;
        instance—>pdata = NPN_MemAlloc(sizeof(PluginInstance));
        PluginInstance* This = (PluginInstance*) instance—>pdata;
        if (This != NULL)
{
        This—>fWindow = NULL;
        This—>window = NULL;
        This—>fMode = mode;
// Mode is NP_EMBED, NP_FULL, or NP_BACK GROUND (see npapi.h)
                instance—>pdata = This;
// save my data pointer in the instance pdata pointer this will be passed back to me in a
// 11 calls so that I can extract it later
return NPERR_NO_ERROR;
        }
    else
        return NPERR_OUT_OF_MEMORY_ERROR;
}
static void UnSubclass(PluginInstance *This)
}
        WNDPROC      OldWndProc;
        WNDPROC*     lplpfn = This—>window—>GetSuperWndProcAddr();
        if ( !*lplpfn )
        {
            ASSERT(0);
            return;
        }
// Set the original window procedure
OldWndProc = (WNDPROC)::SetWindowLong( This—>window—>m_hWnd,
        GWL_WNDPROC, (LONG) *lplpfn );
// A subclassed window's procedure is always AfxWndProc. If this is not TRUE, then it's
// not a subclassed window.
    if (OldWndProc != AfxWndProc )
            ASSERT(0);
}
static void KillTvWindow(PluginInstance *This)
{
/*      if (This—>cAvi) {
                This—>cAvi—>Close();
                delete This—>cAvi;
                This—>cAvi = NULL;
            } */
        UnSubclass (This) ;
        if (This—>window) {
        This—>window—>Detach();
        delete This —>window;
        This—>window = NULL;
        }
}
// NPP_Destroy:
NPError NP_LOADDS
NPP_Destroy(NPP instance, NPSavedData** save)
{
    if (instance == NULL)
        return NPERR_INVALID_INSTANCE_ERROR;
    PluginInstance* This = (PluginInstance*) instance—>pdata;
    if (This != NULL)
```

APPENDIX A-continued

```
        {
            KillTvWindow(This);
            NPN_MemFree(instance—>pdata);
            instance—>pdata = NULL;
        }
        return NPERR_NO_ERROR;
}
//NPP_SetWindow:
NPError NP_LOADDS
NPP_SetWindow(NPP instance, NPWindow* window)
{
        if (instance == NULL)
                return NPERR_INVALID_INSTANCE_ERROR;
        PluginInstance* This = (PluginInstance*) instance—>pdata;
        if (!window)
                return NPERR_GENERIC_ERROR;
        if (!instance),
                return NPERR_INVALID_INSTANCE_ERROR;
        if (!This)
                return NPERR_GENERIC_ERROR;
        if (!window—>window && !This—>window) // spurious entry
                return NPERR_NO_ERROR;
        if (!window—>window && This—>window)
        {
                // window went away
                KillTvWindow(This);
                return NPERR_NO_ERROR;
        }
if (!This—>window && window—>window) {
        This—>window = (CPluginWindow *) new CPluginWindow();
if (!This—>window—>SubclassWindow((HWND)window—>window)) {
        MessageBox(NULL,"SubclassWindow Failed","Plug-in-test",MB_OK);
        return NPERR_GENERIC_ERROR;
        }
                PCV_EnableColorKey();
                WTV_ResetAudio();
                This—>window—>StoreData(This);
        }
This—>window—>InvalidateRect(NULL);
This—>window—>UpdateWindow();
RECT r;
        GetWindowRect(HWND)window—>window,&r);
        PCV_DisableVideo();
        PCV_Createwindow(r.left, r.top, window—>width, window—>height, 1);
        PCV_EnableVideo();
        WTV_CheckQFactor () ;
//      ((HWND)window—>window)—>hbrBackground = This—>bkbrush;
//      InvalidateRect((HWND)window—>window, NULL, TRUE);
    This—>fWindow = window;
    return NPERR_NO_ERROR;
}
//NPP_NewStream:
NPError NP_LOADDS
NPP_NewStream(NPP instance,
                        NPMIMEType type,
                        NPStream *stream,
                        NPBool seekable,
                        uint16 *stype)
{
    if (instance == NULL)
        return NPERR_INVALID_INSTANCE_ERROR;
    PluginInstance* This = (PluginInstance*) instance—>pdata;
    return NPERR_NO_ERROR;
}
int32 STREAMBUFSIZE =OXOFFFFFFF;
// If we are reading from a file in NPAsFile mode so we can take any size stream in our
// write call (since we ignore it). NPP_WriteReady:
int32 NP_LOADDS
NPP_WriteReady(NPP instance, NPStream *stream)
{
        if (instance != NULL)
        {
            PluginInstance* This = (PluginInstance*) instance—>pdata;
        }
        return STREAMBUFSIZE; // Number of bytes ready to accept in NPP_W rite ()
}
// NPP_Write:
int32 NP_LOADDS
NPP_Write(NPP instance, NPStream *stream, int32 offset, int32 len, void *buffer)
```

APPENDIX A-continued

```
{
    if (instance != NULL)
    {
            PluginInstance* This = (PluginInstance*) instance—>pdata;
    }
    return len:           // The number of bytes accepted
}
//NPP_DestroyStream:
NPError NP_LOADDS
NPP_DestroyStream(NPP instance, NPStream *stream, NPError reason)
{
    if (instance == NULL)
        return NPERR_INVALID_INSTANCE_ERROR;
    PluginInstance* This = (PluginInstance*) instance—>pdata;
        return NPERR_NO_ERROR;
}
// NPP_StreamAsFile:
void NP_LOADDS
NPP_StreamAsFile(NPP instance, NPStream *stream, const char* fname)
{
    if (instance != NULL)
    {
            PluginInstance* This = (PluginInstance*) instance—>pdata;
    }
}
// NPP_Print:
void NP_LOADDS
NPP_Print(NPP instance, NPPrint* printInfo)
{
        if(printInfo == NULL) // trap invalid parm return;
        if (instance != NULL)
        {
                PluginInstance* This = (PluginInstance*) instance—>pdata;
            if (printInfo—>mode == NP_FULL)
            {
                void* platformPrint = printInfo—>print.fullPrint.platformPrint;
                NPBool printOne = printInfo—>print.fullPrint.printOne;
                printInfo—>print.fullPrint.pluginPrinted = FALSE; // Do the default
            }
        else // If not fullscreen, we must be embedded
        {
                    NPWindow* printWindow = &(printInfo—>print.embedPrint.window);
                    void* platformPrint = printInfo—>print.embedPrint.platformPrint;
            }
        }
}
// NPP_HandleEvent: Mac-only.
int16 NPP_HandleEvent(NPP instance, void* event)
{
    NPBool eventHandled = FALSE;
    if (instance == NULL)
        return eventHandled;
    PluginInstance* This = (PluginInstance*) instance—>pdata;
    return eventHandled;
}
```

Plgwnd.cpp

```
#include "stdafx.h"
#include "plgwnd.h"
#include <mmsystem.h>
#include "wintv.h"
// CPlugin Window constructor:
CPluginWindow::CpluginWindow()
{
        m_data = NULL
}
void CPluginWindow::OnPaint() {
        CPaintDO do(this); // device context for painting
        //CWnd::OnPaint();
            CBrush brush (WTV_GetKeyColor());
            do.FillRect(&(dc.m_ps.rcPaint), &brush);
}
/*void CPluginWindow::OnMove(int x, int y) {
        POINT worg;
        PCV_DisableVideo();
    PCV_SetWindowPosition((WORD)worg.x,(WORD)worg.y);
        WTV_CheckQFactor();
        PCV_EnableVideo();
} */
```

APPENDIX A-continued

```
void CpluginWindow::StoreData (PluginInstance *data) {
        m_data = data;
}
//Return place to hold original window proc WNDPROC*
PluginWindow::GetSuperWndProcAddr()
{
#ifdef WIN32
        return CWnd::GetSuperWndProcAddr();
#else
    static WNDPROC pfnSuper;     // place to store window proc
    return &pfnSuper;            // always return the same address #endif
}
// CMainWindow message map: Associate messages with member functions.
// It is implied that the ON_WM_PAINT macro expects a member function // "void OnPaint()".
BEGIN_MESSAGE_MAP( CPluginWindow, CWnd )
        //{ { AFX_MSG_MAP( CMainWindow )
        ON_WM_PAINT()
//        ON_WM_MOVE ()
        //} } AFX_MSG_MAP
END_MESSAGE_MAP()
```

Plgwnd.h

```
#ifndef _PLGWND_H_
#define _PLGWND_H_
#include "npapi.h"
#include "stdafx.h"
#include "inst.h"
// CPluginWindow:
class CPluginWindow : public CWnd
{
protected:
     PluginInstance * m_data;
//     CWnd * m_videoWnd;
public:
        CPluginWindow();
    void StoreData(PluginInstance *);
    virtual WNDPROC* GetSuperWndProcAddr();
        //{ { AFX_MSG( CMainWindow )
        afx_msg void OnPaint();
//      afx_msg void OnMove(int x, int y);
        //} } AFX MSG
        DECLARE_MESSAGE_MAP()
};
#endif
```

Npd1132.rc2

```
// PLUGTEST.RC2 - resources Microsoft Visual C++ does not edit directly
#ifdef APSTUDIO_INVOKED
        #error this file is not editable by Microsoft Visual C++
#endif // APSTUDIO_INVOKED
// Version
        VS_VERSION_INFO VERSIONINFO
        FILEVERSION 1,0,0,1
        PRODUCTVERSION 1,0,0,1
        FILEFLAGSMASK 0x3fl
#ifdef _DEBUG
        FILEFLAGS 0x1L
#else
        FILEFLAGS 0x0L
#endif
        FILEOS 0x4L
        FILETYPE 0x2L
        FILESUBTYPE 0x0L
BEGIN
        BLOCK "StringFileInfo"
        BEGIN
            BLOCK "040904e4"
            BEGIN
                VALUE "CompanyName",        "Earthweb LLC\0"
                VALUE "FileDescription",    "Win/TV Inline Plugin\0"
                VALUE "FileVersion",        "0.0.0.1\0"
                VALUE "InternalName", "Inline TV\0"
                VALUE "LegalCopyright",     "Copyright Earthweb LLC 1996/0"
                VALUE "LegalTrademarks",    "\0"
                VALUE "OriginalFilename",   "npd1132.dl1\0"
                VALUE "ProductName", "Inline TV Plugin\0"
                VALUE "ProductVersion",     "0.0.0.1\0"
                VALUE "MIMEType",           "fake/mime-type\0"
                VALUE "FileExtents",        "tv\0"
```

APPENDIX A-continued

```
            VALUE "FileOpenName",      "Fake MIME (*.tv)\0"
        END
    END
    BLOCK "VarFileInfo"
    BEGIN
        VALUE "Translation", 0x409, 1252
    END
END
// Add manually edited resources here . . .
```

What is claimed is:

1. A method for routing application layer packets of information in a network, comprising:
- receiving a packet at a first routing machine including an indication of hierarchical routing information and content using a particular network service;
- accessing a directory based upon the hierarchical routing information in order to obtain routing instructions for the packet;
- the directory including an identification of one or more targets in the network for receiving the packet;
- the one or more targets including at least one client machine and at least one second routing machine;
- transmitting the packet to the at least one client machine; and
- transmitting the packet to the at least one second routing machine to distribute the routing of packets.

2. The method of claim 1 wherein the determining step comprises receiving routing instructions for use in determining the targets.

3. The method of claim 1 wherein the transmitting step comprises transmitting the packet including content using a content push/pull service.

4. The method of claim 3 wherein the transmitting step comprises transmitting the packet including a uniform resource identifier for use in pushing content to the user.

5. The method of claim 3 wherein the transmitting step comprises transmitting the packet including a uniform resource identifier for selection by the user for pulling content.

6. The method of claim 1 wherein the determining step comprises determining the targets in a wide-area network, a local area network, an intranet, or the Internet.

7. The method of claim 1 wherein the receiving step comprises receiving the packet containing video, audio, or multimedia content.

8. The method of claim 1, further comprising requesting routing instructions for transmitting the packet.

9. The method of claim 1, further comprising transmitting a program to the targets.

10. The method of claim 9, further comprising transmitting the program and the packet for simultaneous processing and display of the program and the content on a display monitor associated with the targets.

11. The method of claim 9, further comprising transmitting the program and the packet for simultaneous processing and display of the program and the content on a television associated with the targets.

12. The method of claim 1 wherein the receiving step comprises receiving the packet including an indication of the directory for use in obtaining the routing instructions.

13. The method of claim 1 wherein the receiving step comprises receiving the packet including an indication of an action associated with the service.

14. The method of claim 1 wherein the receiving step comprises receiving the packet containing executable code, data, or executable code with associated data.

15. The method of claim 1 wherein the receiving step comprises receiving the packet containing an object, the object specifying executable code, data, or executable code with associated data.

16. An apparatus for routing application layer packets of information in a network, comprising:
- a receive module for receiving a packet at a first routing machine including an indication of hierarchical routing information and content using a particular network service;
- a determination module for determining targets in a network for receiving the packet based upon the hierarchical routing information, the determination module including a module for accessing a directory in order to obtain routing instructions for the packet;
- the directory including an identification of one or more targets in the network for receiving the packet;
- the one or more targets including at least one client machine and at least one second routing machine to distribute routing of the packets; and
- a transmission module for transmitting the packet to the at least one client machine and the at least one second routing machine to distribute routing of the packets.

17. The apparatus of claim 16 wherein the determination module comprises a module for receiving routing instructions for use in determining the targets.

18. The apparatus of claim 16 wherein the transmission module comprises a module for transmitting the packet including content using a content push/pull service.

19. The apparatus of claim 18 wherein the transmission module comprises a module for transmitting the packet including a uniform resource identifier for use in pushing content to the user.

20. The apparatus of claim 18 wherein the transmission module comprises a module for transmitting the packet including a uniform resource identifier for selection by the user for pulling content.

21. The apparatus of claim 16 wherein the determination module comprises a module for determining the targets in a wide-area network, a local area network, an intranet, or the Internet.

22. The apparatus of claim 16 wherein the receive module comprises a module for receiving the packet containing video, audio, or multimedia content.

23. The apparatus of claim 16, further comprising a module for requesting routing instructions for transmitting the packet.

24. The apparatus of claim 16, further comprising a program source for transmitting a program to the targets.

25. The apparatus of claim 24, further comprising a module for transmitting the program and the packet for simultaneous processing and display of the program and the content on a display monitor associated with the targets.

26. The apparatus of claim 24, further comprising a module for transmitting the program and the packet for simultaneous processing and display of the program and the content on a television associated with the targets.

27. The apparatus of claim 24, further comprising:
a module for transmitting the program for display of the program on a television associated with the targets; and
a module for transmitting the packet for display of the content on a display monitor associated with the targets.

28. The apparatus of claim 16 wherein the receive module comprises a module for receiving the packet including an indication of the directory for use in obtaining the routing instructions.

29. The apparatus of claim 16 wherein the receive module comprises a module for receiving the packet including an indication of an action associated with the service.

30. The apparatus of claim 16 wherein the receive module comprises a module for receiving the packet containing executable code, data, or executable code with associated data.

31. The apparatus of claim 16 wherein the receive module comprises a module for receiving the packet containing an object, the object specifying executable code, data, or executable code with associated data.

32. A system for routing application layer packets of information in a network, comprising:
a network;
a plurality of client machines connected to the network;
an authoring client machine; and
a server connected to the network and the authoring client machine, wherein the server comprises:
a receive module for receiving from the authoring client machine a packet including an indication of hierarchical routing information and content using a particular network service;
a determination module for determining targets among the plurality of client machines in the network for receiving the packet based upon the hierarchical routing information;
the determination module including a directory module for accessing a directory in order to obtain routing instructions for the packet;
the directory including an indication of one or more targets in the network for receiving the packet;
the one or more targets including at least one client machine and at least one second routing machine; and
a transmission module for transmitting the packet to the at least one client machine and the at least one second routing machine to distribute routing the packet.

33. A distributed community network comprising:
a client machine, wherein the client machine provides an interface through which a user may communicate a request and receive content;
a network accessible to the client machine;
at least one service provider connected to the network; and
at least one server connected to the network, wherein the server further comprises a hub, the hub facilitating a connection between the service provider and the client machine;
wherein content is communicated between the service provider and the client machine over the network, wherein the content is provided by the service provider to the client machine in a packet transmitted over the network wherein the packet includes hierarchical information and content information, and wherein the hierarchical information directs a router to obtain from a directory an identification of a hub associated with the client machine such that the content is communicated from the service provider to the client machine via the hub, the network, and at least one server associated with the service provider.

34. The distributed community network of claim 33, wherein the client machine further comprises a device selected from the group consisting of: a television, a digital television, a set top box, a computer workstation, a personal computer, a hand-held computer, and a wireless device.

35. The distributed community network of claim 33, wherein the client machine further comprises a device capable of presenting to a user a signal in a form selected from the group consisting of: a video signal, an audio signal, a multimedia signal, a combined audio and video signal, video stills, animations, text, graphics, slow frame video, and a sequence of individual frames.

36. The distributed community network of claim 33, wherein the network further comprises a network selected from the group consisting of: the Internet, intranet, private network, and a public network.

37. The distributed community network of claim 33, wherein the network is accessed by the client machine utilizing a communications medium selected from the group consisting of: the Internet, intranet, private network, public network, radio frequency broadcast, wireless connection, satellite broadcast, cable, telephone circuit, and a fiber optics circuit.

38. The distributed community network of claim 33, wherein the at least one service provider provides at least one service selected from the group consisting of: a donut service, a chat service, a whiteboard service, and a content push/pull service.

39. The distributed community network of claim 38, wherein the donut service provides content to the user based upon a user profile.

40. The distributed community network of claim 38, wherein multiple services are provided to the user by utilizing at least two service providers connected to the network.

41. The distributed community network of claim 33, wherein the hierarchical information further comprises an identification of a source, a server, a room, and a target.

42. The distributed community network of claim 33, wherein the directory farther comprises a data storage device connected to a server, the data storage device containing a listing of users subscribed to a service and a listing of hubs associated with the users.

43. The distributed community network of claim 33, wherein the content relates to at least one program selected from the group consisting of: an advertisement, a game show program, a motion picture program, a live program, an audio program, a music video program, a pre-recorded program, a news program, and a sports program.

* * * * *